United States Patent [19]

Kovach

[11] Patent Number: 6,023,239
[45] Date of Patent: *Feb. 8, 2000

[54] METHOD AND SYSTEM FOR A DIFFERENTIAL GLOBAL NAVIGATION SATELLITE SYSTEM AIRCRAFT LANDING GROUND STATION

[75] Inventor: Karl L. Kovach, Redondo Beach, Calif.

[73] Assignee: ARINC, Inc., Annapolis, Md.

[*] Notice: This patent issued on a continued prosecution application filed under 37 CFR 1.53(d), and is subject to the twenty year patent term provisions of 35 U.S.C. 154(a)(2).

[21] Appl. No.: 08/947,390

[22] Filed: Oct. 8, 1997

[51] Int. Cl.⁷ .............................. H04B 7/185; G01S 5/02
[52] U.S. Cl. .............................. 342/357.06; 342/357.12; 701/215
[58] Field of Search .............................. 342/357, 357.06, 342/357.12; 701/215

[56] References Cited

U.S. PATENT DOCUMENTS

| | | |
|---|---|---|
| 4,894,655 | 1/1990 | Joguet et al. . |
| 5,268,695 | 12/1993 | Dentinger et al. . |
| 5,323,322 | 6/1994 | Mueller et al. . |
| 5,361,212 | 11/1994 | Class et al. . |
| 5,430,654 | 7/1995 | Kyrtsos et al. . |
| 5,477,228 | 12/1995 | Tiwari et al. . |
| 5,477,458 | 12/1995 | Loomis . |
| 5,490,073 | 2/1996 | Kyrtsos . |
| 5,596,328 | 1/1997 | Stangeland . |

OTHER PUBLICATIONS

"SCAT–I Integrity Method: Detection or Estimation?", Kovach et al., The Institute of Navigation, Proceeding of the National Technical Meeting, Jan. 14, 1997.

Design and Testing of the ARINC Veracious Differential Reference Station, K. Kovach et al., The Institute of Navigation, Jan. 21, 1993 National Technical Meeting.

National Telesystems Conference 1993, "The ARINC Veracious Differential Reference Station Concept and Status", K. Kovach et al., Jun. 16, 1993 IEEE Catalog No. 93CH3318–3.

Proceedings of the ION GPS–93, "ARINC Veracious Differential Reference Station (AVDRS) Development for Dallas/Forth Worth Trials", Johnson et al., The Institute of Navigation, Sep. 22, 1993.

"The Importance of Accurate UDRE Estimates", Kovach et al., The Institute of Navigation, Jan. 22, 1996.

Primary Examiner—Theodore M. Blum
Attorney, Agent, or Firm—Oliff & Berridge, PLC

[57] ABSTRACT

A differential GNSS ground station is disclosed which generates and broadcasts highly veracious GNSS satellite differential correction data suitable for use in the landing of aircraft. In this context, "veracious' includes the qualities of both accuracy and integrity wherein the broadcast differential correction data is corrupted by a lower level of errors than is customary for the current state of the art and the broadcast differential correction data includes reliable estimates of the noise errors and bias errors corrupting the differential corrections for each GNSS satellite signal. The ground station comprises at least two independent GNSS satellite signal receivers, a processing apparatus for collecting and processing information from the at least two independent GNSS receivers, and a transmitter for broadcasting the composite DGNSS correction signals over a distance.

24 Claims, 12 Drawing Sheets

METHOD AND SYSTEM FOR A DIFFERENTIAL GLOBAL NAVIGATION SATELLITE SYSTEM AIRCRAFT LANDING GROUND STATION

BACKGROUND OF THE INVENTION

1. Field of Invention

The invention relates generally to a Global Navigation Satellite System (GNSS) augmentation system and, in particular, to differential methods and apparatus to support aircraft landing operations.

2. Description of Related Art

The Navstar Global Positioning System (GPS) is an all-weather, worldwide, highly accurate three dimensional radionavigation system. Developed and operated by the U.S. Department of Defense (DOD), the system includes a constellation of Earth-orbiting satellites at semisynchronous altitude, a dedicated ground control system which supports those satellites, and a large number of user terminals ("GPS receivers") which passively track the satellite broadcast L-band signals (1.6 and optionally 1.2 GHz) in order to precisely determine their position and velocity in the World Geodetic System 1984 (WGS-84) coordinate frame along with internal GPS system time which is, in turn, related to Coordinated Universal Time (UTC).

GPS is just one example of a GNSS. Another example is the Global Orbiting Navigation Satellite System (GLONASS) operated by the Russian Federation. GPS and GLONASS can each function as a stand-alone GNSS, or they may be used together in a hybrid GNSS manner with combined GPS/GLONASS receivers passively tracking the L-band signals broadcast by both sets of satellites for improved accuracy and reliability. In the future, the on-orbit GPS and GLONASS satellites will be joined by other navigation satellites developed and operated by civil agencies, notably the U.S. Federal Aviation Administration (FAA), which are specifically designed to be used in conjunction with GPS or GLONASS or both GPS and GLONASS as part of an overarching GNSS for even better accuracy and reliability.

Although having more satellites available for use in a GNSS, GPS improves the accuracy and reliability of that GNSS, particularly with respect to improving the availability of integrity (i.e., the ability of the GNSS receiver to verify the accuracy of its position and velocity solution). However, there are economic limits as to how many satellites can be placed in orbit and hence, limits as to how accurate and reliable a GNSS can be. For applications that demand high levels of accuracy, reliability, and integrity, the typical method of achieving these levels for a GNSS is to employ correction signals from a ground-based differential system to augment the satellite signals being tracked by the GNSS receiver. These augmentation signals from the ground-based system are intended to differentially correct for those aberrations of the satellite signals which will be tracked by the GNSS receiver and will, if not differentially corrected for, cause the GNSS receiver to compute a slightly erroneous position and velocity solution. As long as the differential system itself operates with very high accuracy, reliability, and integrity, the augmentation signal corrections provided to the GNSS receiver can counteract the effects of satellite signal aberrations which are external to the GNSS receiver, leaving the GNSS receiver internal effects (tracking inaccuracies, software errors, hardware faults, and the like) as the limiting factor in accuracy, reliability, and integrity.

Presently, the most widely used ground-based differential system for GNSS is a stand-alone Differential Global Positioning System (DGPS) ground station. Traditionally, DGPS ground stations have used a "reference and monitor" architecture to maintain the accuracy and integrity of their output differential correction signals. This is basically the same architecture used by many existing ground-based radionavigation aids such as instrument landing systems (ILSs) and microwave landing systems (MLSs). The design of a traditional DGPS ground station incorporates two independent GPS receivers, each with its own dedicated receiving antenna, which are installed at separate locations with well-known coordinates. One of the receivers is the source reference receiver and the other receiver is the integrity monitor receiver. Under this traditional design, the source reference receiver tracks the incoming satellite signals, uses its known coordinates to determine the effect of any satellite signal aberrations, develops mathematical correction factors which will counteract the effect of the satellite signal aberrations, and broadcasts those corrections to the mobile GPS receivers that are specially equipped to receive, process, and apply the differential correction factors to their own satellite signal tracking measurements. The integrity monitor receiver serves only to verify the integrity of the differential correction factors broadcast by the source reference receiver either by 1) mimicking a mobile GPS receiver and applying the broadcast corrections to its own measurements to verify that the resulting position and velocity closely matches the known coordinates and known velocity (zero) of the integrity monitor receiver, or 2) mimicking the source reference receiver and verifying that the differential correction factors it computes using its own measurements and known coordinates closely match the corrections broadcast by the source reference receiver.

Although a traditionally designed DGPS ground station is sufficient for many applications, it is wasteful in terms of accuracy and integrity. Because correction data from only one receiver (the source reference receiver) is broadcast to the mobile GPS receivers, while the other receiver (the integrity monitor receiver) simply verifies the broadcast correction data, no significant advantage is gained from having two receivers in the DGPS ground station. The delivered accuracy of the DGPS ground station is entirely dependent on the accuracy of the source reference receiver, while the delivered integrity is entirely dependent on the integrity of the integrity monitor receiver. The maximum advantage of having two (or more) receivers in the DGPS ground station can only be realized if both (or all) receivers contribute to the delivered accuracy and integrity of the broadcast correction data.

The qualities of accuracy and integrity are together known as "veracity". Regardless of the GNSS satellites being used, a veracious differential GNSS (DGNSS) ground station broadcasts differential corrections which are corrupted by a lower level of errors than the corresponding differential corrections from a non-veracious DGNSS ground station and—just as importantly—also broadcasts data describing the level of errors corrupting the differential corrections which are more reliable than the corresponding data from a non-veracious DGNSS ground station. For aircraft landing operations, the critical differential correction data which must be veracious are the pseudorange correction (PRc) values for each GNSS satellite signal and the user differential range error (UDRE) values for each PRc value. Although there is only one PRc value for each GNSS satellite signal at any one time, veracious DGNSS ground stations provide at least two different UDRE values for each PRc value. One UDRE value (SIGMA) describes the level of noise errors corrupting the associated PRc value while the other UDRE value (BIAS) describes the total bias error corrupting that PRc value. Veracious DGNSS ground stations broadcast accurate PRc values along with reliable SIGMA and BIAS UDRE values to provide the integrity for each PRc value.

Industry currently lacks devices necessary for efficient and veracious DGNSS ground stations. Some DGNSS ground stations are efficient and some DGNSS ground stations are veracious, but there are no DGNSS ground stations are both efficient and veracious.

SUMMARY OF THE INVENTION

The objective of the present invention is to make efficient and veracious use of the GNSS satellite signal observations produced by the GNSS receivers in the DGNSS ground station. The equipment of the invention assures that higher veracity (better accuracy and improved integrity) is achieved, while at the same time retaining the cross-checking benefits of the traditional approach to DGNSS systems.

Briefly, a GPS-based embodiment of the present invention may include a ground station for broadcasting DGPS correction signals to nearby aircraft (or optionally to nearby ships or to nearby land vehicles). The ground station may include at least two independent GPS satellite signal receivers each with its own dedicated receiving antenna, a processing apparatus for collecting and processing the plurality of satellite signal observations produced by the GPS receivers by fusing information derived from those satellite signal observations to generate a set of combined DGPS correction data, and a transmitter for broadcasting the DGPS correction data as digitally encoded "DGPS correction signals". Thus, a DGPS correction signal may be efficiently provided to nearby mobile GPS receivers for use in conjunction with their own tracking of the signals from the GPS satellites.

Embodiments may optionally include a second processing apparatus ("integrity processor") to duplicate the functions of the primary processor and to perform a cross-check of the combined DGPS correction data generated. Embodiments may also optionally include a broadcast signal receiver to verify that the DGPS correction signals intended for broadcast (and only the DGPS correction signals intended for broadcast) are broadcast to verify proper operation of the ground station transmitter.

Other embodiments may include ground stations with more than two independent GPS satellite receivers to produce multiple independent satellite signal observations that are incorporated in the fusing process and generate combined DGPS correction data with further enhanced accuracy.

Certain embodiments may substitute independent GLONASS satellite receivers for the GPS satellite receivers to efficiently provide DGLONASS correction signals. Other embodiments may alternatively substitute independent GPS/GLONASS (hybrid GNSS) satellite receivers for the GPS satellite receivers to efficiently provide DGPS/DGLONASS (hybrid DGNSS) correction signals. Other similar substitutions may be made with satellite receivers that track a mix of GNSS satellites including GPS satellites, GLONASS satellites, Wide Area Augmentation System (WAAS) satellites, European Geostationary Navigation Overlay Service (EGNOS) satellites, and the like.

Additional embodiments may substitute the data stream from an external DGNSS system, which provides differential corrections for a compatible mix of GNSS satellites, for one of the independent GNSS receivers, as well as part of the associated ground station processing. Further embodiments accept and use the data stream from an external DGNSS system as one more additional independent GNSS receiver.

These embodiments of the present invention, and their respective advantages, will become apparent to those of ordinary skill in the art after having read the following description of the preferred embodiments which are illustrated in the various drawing figures.

BRIEF DESCRIPTION OF THE DRAWINGS

The invention will be described with reference to the following drawings in which like reference numerals refer to the elements and wherein.

DETAILED DESCRIPTION OF PREFERRED EMBODIMENTS

Figure 1:
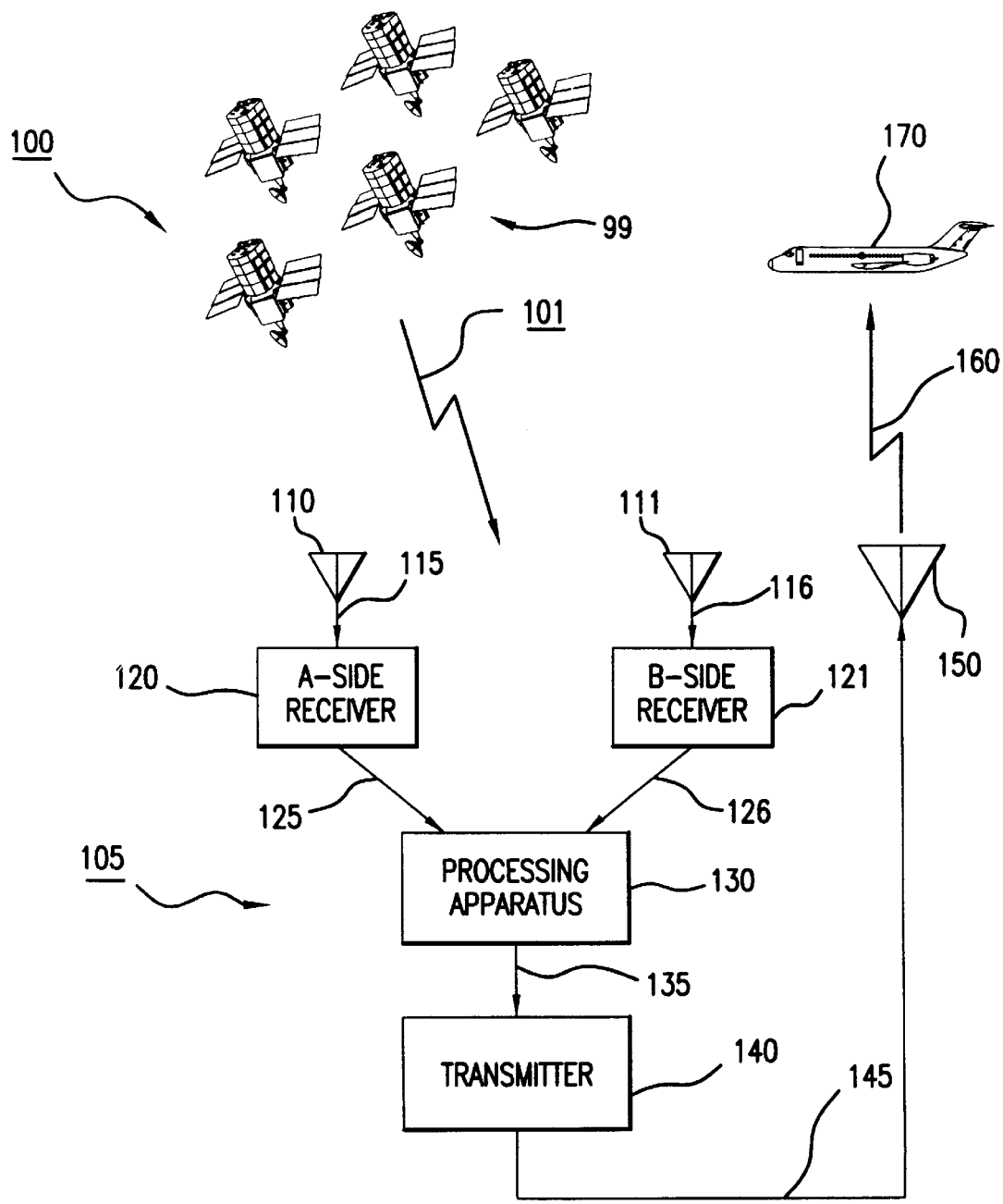
FIG. 1 is a block diagram of the first embodiment of a DGNSS system in accordance with the present invention.

FIG. 1 is a block diagram of the first embodiment of a DGNSS system according to the present invention for providing differential correction signals to an aircraft for landing. As well understood by those skilled in the art, a group of GNSS satellites 100 broadcast radio frequency signals 101 which are suitable for passive pseudoranging based on time-of-arrival measurements. In the first embodiment, each one of the GNSS satellites 100 is a GPS satellite 99. A ground station 105, which incorporates two independent GPS signal receivers 120 and 121 each with its own dedicated GPS receiving antenna 110 and 111, receives the radio frequency signal broadcast by each GPS satellite twice. Each signal is received once by the A-side receiving antenna 110 and once by the B-side receiving antenna 111. Using any of a number of techniques which are known to those skilled in the art, the A-side GPS receiver 120 and the B-side GPS receiver 121 independently lock-on to and track each GPS satellite signal present in the composite electrical signal presented by their associated GPS receiving antenna 115 and 116. The A-side GPS receiver 120 periodically outputs sets of raw observation data 125 for the GPS satellites it is tracking to the processing apparatus 130. The B-side GPS receiver 121 likewise periodically outputs sets of raw observation data 126 for the GPS satellites it is tracking to the processing apparatus 130. The raw observation data output from each GPS receiver for each GPS satellite signal being tracked includes the current pseudorange measurement (PRm) for that satellite as well as the navigation (NAV) data demodulated from the satellite's broadcast signal. The processing apparatus 130 collects and processes the satellite signal observation data produced by the GPS receivers, generates and fuses the pseudorange correction (PRc) and user differential range error (UDRE) information derived from the satellite signal observations, and generates an integrated message stream 135 which includes the combined DGPS correction messages as well as other system messages for output to the transmitter 140. The transmitter 140 modulates its radio frequency output 145 with the digitally encoded messages provided by the processing apparatus 130 and then broadcasts the resulting DGPS correction signals 160 through the transmit antenna 150 to the appropriate mobile GPS receiving equipment on nearby aircraft 170. To minimize the risk of common mode environmental error sources corrupting the receiving antenna reception of the GPS satellite signals in the preferred embodiment, the A-side receiving antenna 110 and the B-side receiving antenna 111 are preferably installed in locations which are as free of reflected (multipath) signals as possible and are separated from each other by a distance at least as large as the effective multipath bandwidth for the particular GPS receivers being used (e.g., 450 meters for standard correlator spacing GPS receivers). To minimize the risk of common mode failures in the preferred embodiment, the GNSS satellite lock-on and tracking techniques used by the A-side GPS receiver 120 and the B-side GPS receiver 121 should be as dissimilar as possible (i.e., developed and manufactured by separate parties).

Figure 2:
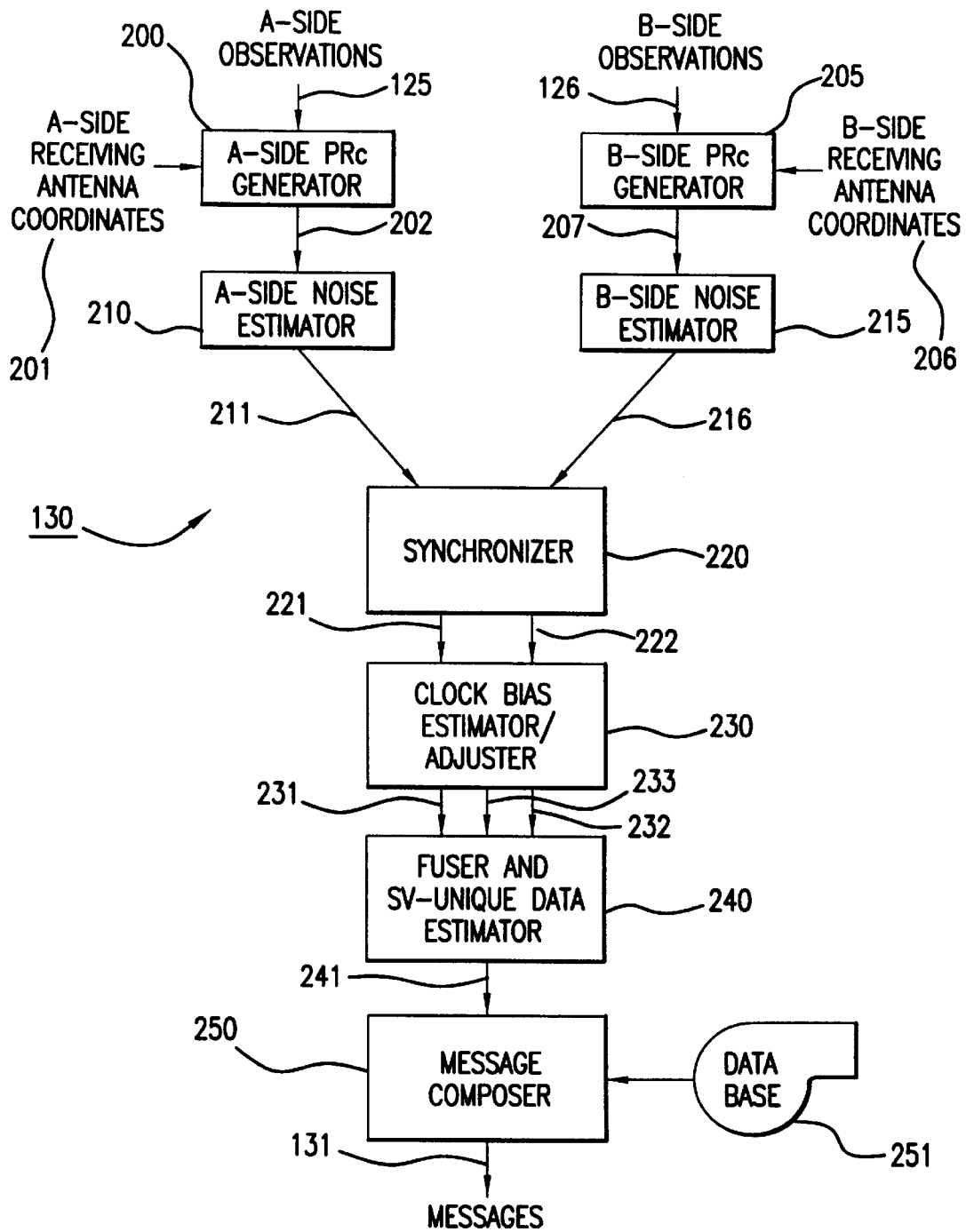
FIG. 2 is a block diagram illustrating the signals produced in the first embodiment and the method of the first embodiment.

FIG. 2 is a block diagram illustrating the operations performed and the signals sent within the processing apparatus 130 in the first embodiment. This method may be performed by a programmed processor. Observation data 125 provided by the A-side GPS receiver 120 for each GPS satellite signal it is tracking, is accepted and processed by the A-side PRc generator 200. Similarly, but independently, observation data 126 provided by the B-side GPS receiver 121 for each GPS satellite signal it is tracking, is accepted and processed by the B-side PRc generator 205. Using one of a number of various techniques widely known to those skilled in the art, the A-side PRc generator 200 computes and outputs a packet of information 202 containing the PRc and range rate correction (RRc) values at the current A-side point in time for each tracked GPS satellite signal based on the observation data 125 provided by the A-side GPS receiver 120 as well as on the known coordinates 201 of the A-side GPS satellite signal receiving antenna (the algebraic sense of the PRc and RRc values is the expected quantity minus the observed/measured quantity). Similarly, but independently, using a different one of the number of various techniques widely known to those skilled in the art, the B-side PRc generator 205 computes and outputs a packet of information 207 containing the PRc and RRc values at the current B-side point in time for each tracked GPS satellite signal based on the observation data 126 provided by the B-side GPS receiver 121 as well as on the known coordinates 206 of the B-side GPS satellite signal receiving antenna.

The packet of A-side PRc/RRc value information 202 provided by the A-side PRc generator 200 is accepted and processed by the A-side noise estimator 210. Similarly, but independently, the packet of B-side PRc/RRc value information 207 provided by the B-side PRc generator 205 is accepted and processed by the B-side noise estimator 215. Using a technique more or less equivalent to the technique described in FIG. 3, the A-side noise estimator 210 computes and outputs a packet of information 211 containing the PRc/RRc values at the current A-side point in time for each tracked GPS satellite signal along with an accurate estimate of the particular high-frequency noise effects corrupting each PRc value out of the plurality of PRc values in the associated packet of A-side PRc/RRc value information 202. Similarly, using a technique more or less equivalent to the technique described in FIG. 3, the B-side noise estimator 215 computes and outputs a packet of information 216 containing the PRc/RRc values at the current B-side point in time for each tracked GPS satellite signal along with an accurate estimate of the particular high-frequency noise effects corrupting each PRc value out of the plurality of PRc values in the associated packet of B-side PRc/RRc value information 207.

The packet of A-side PRc/RRc and high-frequency noise estimate values 211 provided by the A-side noise estimator and the packet of B-side PRc/RRc and high-frequency noise estimate values 216 provided by the B-side noise estimator 215 are then accepted and processed in tandem by the common (neither A-side nor B-side) synchronizer 220. The synchronizer 220 verifies that the current A-side point in time reference for the information contained in the packet of A-side estimates 211 and the current B-side point in time reference for the information contained in the packet of B-side estimates 216 are both equal to the desired point in time for the combined message output.

If the synchronizer 220 determines the current A-side point in time reference for the information contained in the packet of A-side estimates is earlier than the desired point in time for the combined message output, the synchronizer 220 will extrapolate the information contained in the packet of A-side estimates forward to the desired point in time for the combined message output and will update the A-side point in time reference for the packet of A-side estimates. Likewise, if the synchronizer 220 determines the current B-side point in time reference for the information contained in the packet of B-side estimates is earlier than the desired point in time for the combined message output, the synchronizer 220 will extrapolate the information contained in the packet of B-side estimates forward to the desired point in time for the combined message output and will update the B-side point in time reference for the packet of B-side estimates.

If the synchronizer 220 determines that either the current A-side point in time reference or the current B-side point in time reference is later than the desired point in time for the combined message output, the synchronizer 220 will adjust its desired point in time for the combined message output to be the next succeeding desired point in time for a combined message output and extrapolate accordingly. Once the synchronizer 220 verifies that the A-side point in time reference for the packet of A-side estimates and the B-side point in time reference for the packet of B-side estimates are now both equal to the desired point in time for the combined message output, the synchronizer 220 outputs the packet of A-side estimates 221 and packet of B-side estimates 222.

The time synchronized packet of A-side estimates 221 and packet of B-side estimates 222 provided by the synchronizer 220 are then accepted and processed in tandem by the common (neither A-side nor B-side) clock bias estimator/adjuster 230. Using a technique more or less equivalent to the technique described in FIG. 4, the clock bias estimator/ adjuster 230: 1) optimally estimates the relative measurement clock bias between the apparent GPS time clock in the A-side GPS receiver 120 and the apparent GPS time clock in the B-side GPS receiver 121, 2) ensures that the estimated relative measurement clock bias term has not been corrupted by faulty measurements made by either the A-side GPS receiver 120 or the B-side GPS receiver 121, and 3) mathematically adjusts the information contained in the packet of B-side estimates 222 to account for the estimated relative measurement clock bias and thereby effectively bring the apparent GPS time clock in the B-side GPS receiver 121 into effective alignment with the apparent GPS time clock in the A-side GPS receiver 120.

Alternatively, the information contained in the packet of A-side estimates 221 can be adjusted to account for the estimated relative measurement clock bias and effectively bring the apparent GPS time clock in the A-side GPS receiver 120 into alignment with the apparent GPS time clock in the B-side GPS receiver 121. These two alternative implementations are equivalent and embody the same invention. Once the clock bias estimator/adjuster has effectively aligned the apparent GPS time clocks for the A-side GPS receiver 120 and the B-side GPS receiver 121, the clock bias estimator/adjuster outputs the packet of A-side estimates 231 (which, being unadjusted, are identical to 221), the adjusted packet of B-side estimates 232, and the associated list of data 233 regarding the detection of any faulty measurements made by either the A-side GPS receiver 120 or the B-side GPS receiver 121.

The packet of A-side estimates 231, the adjusted packet of B-side estimates 232, and the list of detected faulty measurement data 233 provided by the clock bias estimator/adjuster are then accepted and processed collectively by the common (neither A-side nor B-side) fuser and SV-unique data estimator 240. Using a technique more or less equivalent to the technique described in FIG. 5, the fuser and SV-unique data estimator 240 optimally fuses the information from the packet of A-side estimates with the information from the adjusted packet of B-side estimates to develop a set of "combined" DGPS correction estimates that is statistically more accurate than either the set of A-side or B-side estimates alone and accurately estimates the probable errors (inaccuracies) corrupting the combined DGPS correction estimates for each satellite addressed. Once the fuser and SV-unique data estimator have developed the set of combined DGPS correction estimates along with the associated error estimates, the fuser and SV-unique data estimator outputs a single integrated packet of combined estimates 241.

The integrated packet of combined estimates 241 provided by the fuser and SV-unique data estimator is then accepted and processed by the message composer 250. Using any of a number of various techniques widely known to those skilled in the art, the message composer 250 translates, scales, and formulates the information contained in the integrated packet of combined estimates to produce combined DGPS correction messages. The DGPS correction messages are produced in the desired structure and format necessary to be sent to and interpreted by the intended mobile receiving equipment. The message composer 250 also produces other system messages, such as landing approach path waypoint coordinates selected from an a priori data base 251, as necessary for the particular implementation using conventional techniques. As the messages are produced, the message composer 250 outputs them in a serial manner 131 for the transmitter 140 to use in generating the broadcast DGPS correction signals.

Figure 3A:
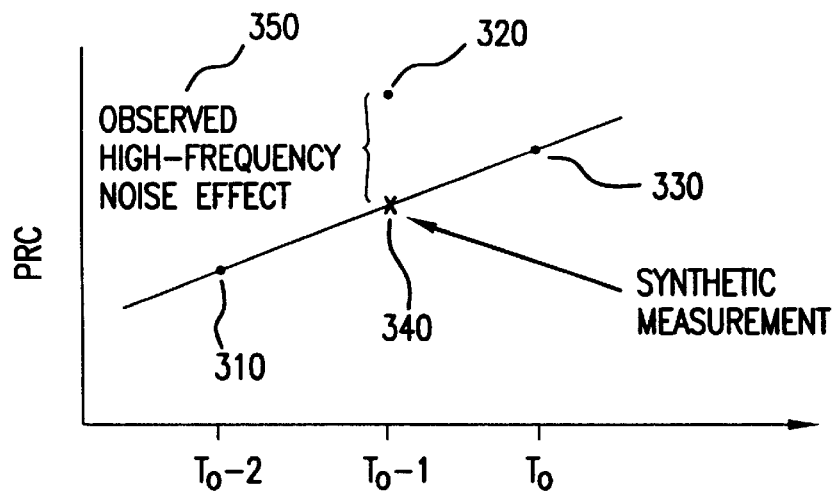
FIGS. 3a–3b is a graphical representation of the noise estimation process.

FIG. 3 is a graphical representation of the noise estimation process within the A-side noise estimator portion 210 and within the B-side noise estimator portion 215 of the processing apparatus 130 in the first embodiment. In FIG. 3a, PRc measurements for a particular satellite from either the A-side PRc generator 200 or the B-side PRc generator 205 are plotted against time with ticks 310, 320 and 330 representing successive PRc measurements over time. Tick 330 represents the most recent PRc measurement at time $T_0$. Tick 310 represents the earliest PRc measurement needed for the process at time $T_0-2$. Tick 320 represents the necessary intervening PRc measurement at time $T_0-1$. The two end-point PRc measurements, 330 and 310, are used along with an interpolation method to produce a "synthetic PRc measurement" 340 at the same point in time as the actual intervening PRc measurement 320. Since high-frequency noise effects will corrupt each PRc measurement independently, where "high-frequency" is defined relative to the observation rate of the PRc measurements, the high-frequency noise effects corrupting the synthetic PRc measurement 340 are independent of the high-frequency noise effects corrupting the actual intervening PRc measurement 320. Thus, the difference 350 between the synthetic PRc measurement 340 and the actual intervening PRc measurement 320 is an observation of the high-frequency noise error (HFNE) effects corrupting the time series of PRc measurements.

Figure 3B:
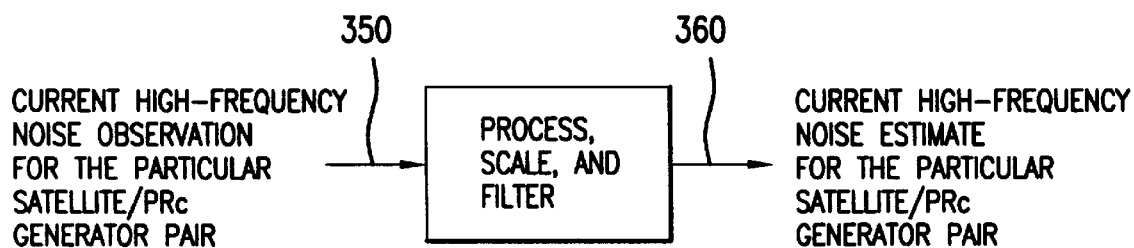

As shown by FIG. 3b, properly processing, scaling, and filtering successive HFNE observations 350 for a particular satellite from a particular PRc generator over time using any of a number of the various statistical methodologies which are known to those skilled in the art provides an accurate estimate of the HFNE effects corrupting the PRc measurements for that particular satellite from that particular PRc generator 360. Independently repeating the process for each particular satellite and each particular PRc generator out of the plurality of satellites and PRc generators provides the desired accurate and uncorrelated estimates of the HFNE effects corrupting the PRc measurements for all satellite/PRc generator pairings. Note that the HFNE estimates 360 are direct functions of the effects of the high-frequency noises corrupting the actual PRc measurements themselves and that the HFNE estimates 360 are the product of a time series estimation process where the HFNE observations 350 at multiple points in time are required (in contrast to being either the product of a "snapshot" estimation process or an "a priori threshold" detection process where just the HFNE observation 350 at the current point in time is required).

Figure 4A:
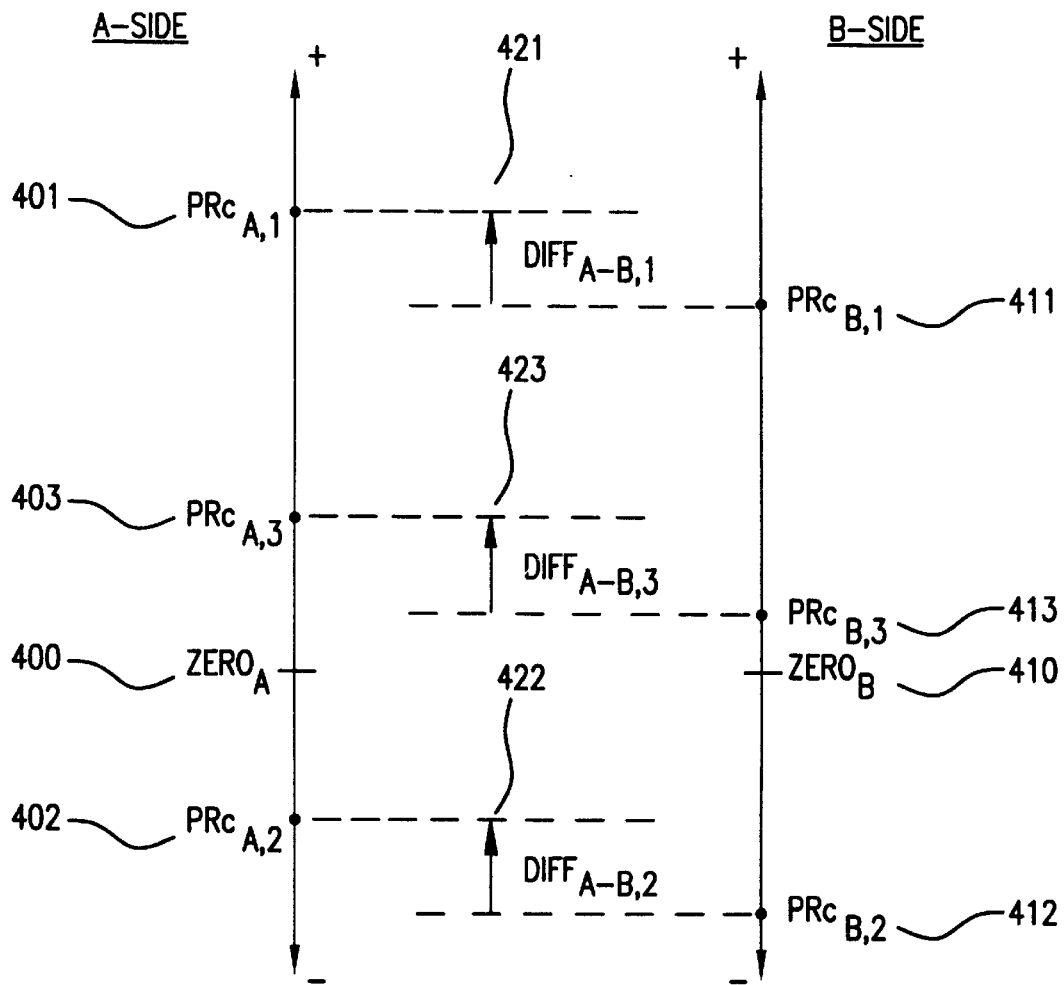
FIGS. 4a–4c are a graphical representations of the relative measurement clock bias noise estimation process, fault detection and exclusion process, and mathematical adjustment process.
Figure 4B:
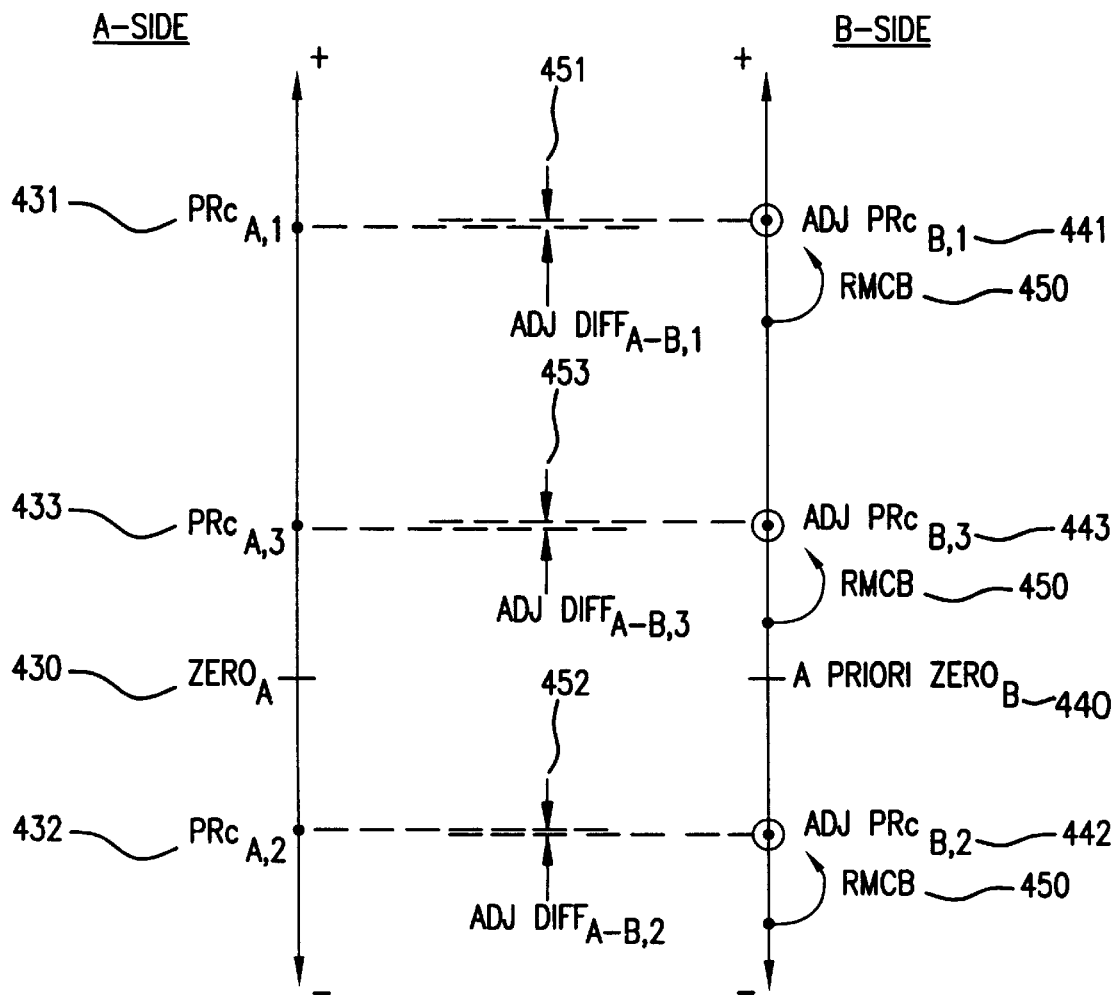
Figure 4C:
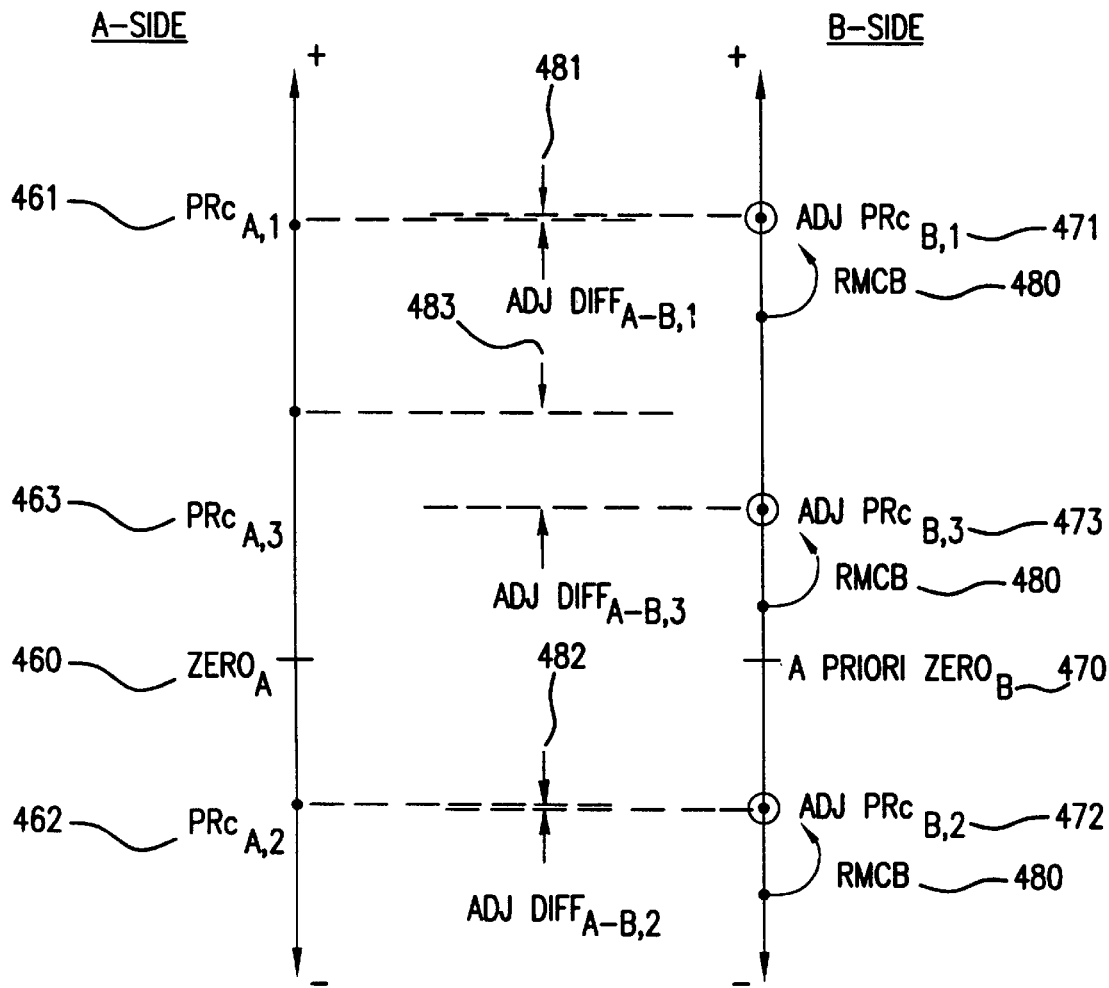

FIGS. 4a–4c are graphical representations of the relative measurement clock bias noise estimation, mathematical adjustment, and fault detection and exclusion (FD&E) processes, all of which occur within the clock bias estimator/adjuster portion 230 of the processing apparatus 130 in the first embodiment. FIG. 4a contains an example which illustrates the simplest conditions under which the FD&E process can be performed. The left-hand side of FIG. 4a shows the PRc measurements produced by the A-side of the processing apparatus while the right-hand side of FIG. 4a shows the corresponding PRc measurements produced by the B-side of the processing apparatus. Each PRc measurement is identified by a pair of subscripts; the first subscript identifying whether the PRc measurement was produced by the A-side or the B-side, and the second subscript identifying to which satellite the particular PRc measurement pertains. FIG. 4a shows PRc measurements for three satellites out of the plurality of satellites which are addressed in the packet of A-side estimates 231 as: $PRc_{A,1}$ 401 for the first satellite (satellite number 1), $PRc_{A,2}$ 402 for the second satellite (satellite number 2), and $PRc_{A,3}$ 403 for the third satellite (satellite number 3). The corresponding three PRc measurements for the same satellites from the B-side are: $PRc_{B,1}$ 411 for satellite number 1, $PRc_{B,2}$ 412 for satellite number 2, and $PRc_{B,3}$ 413 for satellite number 3. For illustrative purposes, example numerical values for the PRc measurements are indicated by the placement of the ticks along the vertical axes of FIG. 4a with the more positive (greater) PRc measurements being placed higher and the more negative (lesser) PRc measurements placed lower along the vertical axes. The numerical zero point for the A-side axis ($Zero_A$ 400) and the initial (a priori) numerical zero point for the B-side axis ($Zero_B$ 410) are placed equally on their corresponding vertical axes.

The situation shown in FIG. 4a is representative of the typical case in actual operations wherein the PRc measurements from one side of the processing apparatus 130 are biased positively or negatively in a common-mode ensemble sense relative to the PRc measurements from the other side of the processing apparatus. In FIG. 4a, for example, the PRc measurements from the A-side are all shown as being positively biased relative to the corresponding PRc measurements from the B-side (or equivalently, the B-side measurements can be said to be negatively biased relative to the A-side measurements). The numerical difference between the A-side PRc measurement and the B-side PRc measurement for satellite number 1, $DIFF_{A-B,1}$ 421, is indicative of the positive common-mode bias. Similarly, the numerical differences between the A-side and B-side PRc measurements for satellite number 2, $DIFF_{A0-B,2}$ 422, and the A-side and B-side PRc measurements for satellite number 3, $DIFF_{A-B,3}$ 423, are also indicative of the same positive common-mode bias. This sort of relative A-side/B-side common-mode bias is characteristic of the present invention due to there being no attempt at a priori synchronization—physical or otherwise—of the apparent GPS time clocks in the A-side and B-side GPS receivers. This differs from the current state of this art which relies on a priori synchronization of the apparent GPS time clocks through either common-view receiver tracking of an artificially injected calibration signal, direct hardwire synchronization, or by reference to one or more external atomic (Cesium/Rubidium) clocks.

The observed ensemble of numerical differences between the corresponding A-side and B-side PRc measurements for each satellite can be used to optimally estimate the relative measurement clock bias (RMCB) between the apparent GPS time clocks in the A-side and B-side GPS receivers. In the preferred embodiment, this optimal estimation of the RMCB is performed using a weighted least squares (WLS) process where the weighting parameters are a function of the HFNE estimates 360 produced by the A-side noise estimator 210 and the B-side noise estimator 215 as well as a desensitization factor (DF) to minimize the dominating effects of low-noise PRc measurement from satellites at high elevation angles. Sub-optimal RMCB estimation methods, such as simple averaging of the numerical differences between the corresponding A-side and B-side PRc measurements, are also within the scope of the present invention. The relevant WLS mathematics are as follows:

For each included satellite "i":

$$DIFF_{A-B,i} = PRc_{A,i} - PRc_{B,i}$$

$$VAR_i = (HFNE_{A,i})^2 + (HFNE_{B,i})^2 + (DF)^2$$

Summing across all included satellites:

$$SUMINVAR = \Sigma(1/VAR_i)$$

Then:

$$RMCB = (1/SUMINVAR) * \Sigma(DIFF_{A-B,i}/VAR_i)$$

The RMCB value thus produced is then added to the B-side PRc measurements for each satellite to result in mathematically adjusted B-side PRc measurements. This adjustment process is illustrated in FIG. 4b where the RMCB value 450 corresponding to FIG. 4a is shown as being added to the B-side PRc measurements from FIG. 4a to give the adjusted (ADJ) B-side PRc measurements ADJ $PRc_{B,1}$ 441, ADJ $PRc_{B,2}$ 442, and ADJ $PRc_{B,3}$ 443 relative to the unadjusted a priori $Zero_B$ 440. The post-adjustment differences ADJ $DIFF_{A-B,1}$ 451, ADJ $DIFF_{A-B,2}$ 452, and ADJ $DIFF_{A-B,3}$ 453 will all be small as shown in FIG. 4b if the RMCB value is accurate.

In rare situations, one of the A-side or B-side PRc measurements may be corrupted by the presence of multipath errors or by a GPS receiver failure such that the PRc measurement does not accurately represent the true differential correction for the affected satellite signal. Alternatively, there may be an abnormal satellite signal condition (e.g., large ephemeris error) which manifests itself differently at the A-side and B-side GPS receiving antennas 110 and 111 such that there is no single differential correction for the affected satellite signal. In these situations, the RMCB value produced according to the above description will be inaccurate. To detect the occurrence of an inaccurate RMCB value caused by an inaccurate PRc measurement, the clock bias estimator/adjuster portion of the processing apparatus performs a statistical consistency test between the ensemble of $DIFF_{A-B,i}$ values and the RMCB value before the RMCB value is added to the B-side PRc measurements (i.e., the RMCB value is only a "candidate RMCB value" until the statistical consistency test is passed). In the preferred embodiment, the statistical consistency test is of the following form where the test threshold ($THRSH^2$) is a function of the number of satellite PRc measurements used in computing the candidate RMCB value and of the desired levels of integrity and continuity for the particular application where the desired levels of integrity and continuity determine how accurate the candidate RMCB value must be to be accepted.

Summing across all included satellites:

$$THRSH^2 > \Sigma((DIFF_{A-B,i} - RMCB)^2/VAR_i)$$

If the statistical consistency test passes (i.e., if the above inequality is true), then the candidate RMCB value is accepted as being sufficiently accurate and is added to the B-side PRc measurements as shown in FIG. 4b. If the statistical consistency test fails, then the occurrence of an "inaccurate" RMCB value caused by an "inaccurate" $DIFF_{A-B,i}$ value which embodied an "inaccurate" PRc measurement will have been detected. Since one of the objectives of the present invention is to generate and provide accurate differential corrections with high levels of integrity and continuity, and since inaccurate RMCB values inhibits achieving this objective, an inaccurate RMCB value is defined to be a "fault" in the apparatus of the invention. Due to causality, an inaccurate $DIFF_{A-B,i}$ value and an inaccurate PRc measurement are likewise each defined to be faults in the apparatus of the invention.

Provided there are three or more $DIFF_{A-B,i}$ values in the ensemble of $DIFF_{A-B,i}$ values used to compute a candidate RMCB value which fails the statistical consistency test, and provided only one $DIFF_{A-B,i}$ value is faulty due to either a faulty A-side or B-side PRc measurement, then the faulty $DIFF_{A-B,i}$ value will be that $DIFF_{A-B,i}$ value with the largest absolute value of its difference with the candidate RMCB value. The present invention takes advantage of this fact by first identifying the faulty $DIFF_{A-B,i}$ value, second, excluding that faulty $DIFF_{A-B,i}$ value from the ensemble of $DIFF_{A-B,i}$ values used to compute the original candidate RMCB value, and third, computing a new and now accurate RMCB value based on the reduced subset ensemble of $DIFF_{A-B,i}$ values. Because the faulty $DIFF_{A-B,i}$ value has been both detected and excluded from the RMCB value, this process is known as "fault detection and exclusion (FD&E)". Although detecting and excluding a faulty $DIFF_{A-B,i}$ value also effectively constitutes detecting and excluding a faulty PRc measurement, this process is unable to identify whether it is the A-side or B-side PRc measurement which is faulty. Hence, the clock bias estimator/adjuster portion 240 of the processing apparatus 130 in the first embodiment is not able to perform fault detection and identification/isolation (FD&I). This limitation of the first embodiment is remedied in the sixth embodiment of the present invention which is described below.

Those skilled in the art will immediately recognize that the FD&E process requires a minimum of three $DIFF_{A-B,i}$ values in the ensemble of $DIFF_{A-B,i}$ values to assure the computation of an accurate candidate RMCB value in the presence of a faulty $DIFF_{A-B,i}$ value. Equivalently stated, three pairs of corresponding A-side and B-side PRc measurements are required to assure an accurate candidate RMCB value in the presence of a faulty A-side or B-side PRc measurement. Two $DIFF_{A-B,i}$ values or two pairs of corresponding A-side and B-side PRc measurements are sufficient to assure an accurate candidate RMCB value when there are no faulty A-side or B-side PRc measurements (i.e., the fault detection portion of the FD&E process is available), but exclusion is not possible with only two $DIFF_{A-B,i}$ values or pairs of PRc measurements. With four or more $DIFF_{A-B,i}$ values/pairs of corresponding A-side and B-side PRc measurements, successive repetitions of the FD&E process are able to detect and exclude multiple faults. The examples in FIGS. 4a–c contain three $DIFF_{A-B,i}$ values and three pairs of corresponding A-side and B-side PRc measurements since this is the simplest condition for illustrating the FD&E process.

FIG. 4c shows the results of the FD&E process assuming that a fault in the $DIFF_{A-B,i}$ value for satellite number 3 (i.e., $DIFF_{A-B,3}$) has been detected and excluded. Although the clock bias estimator/adjuster portion 240 of the processing apparatus 130 in the first embodiment cannot determine whether the fault lies with the A-side PRc measurement for satellite number 3 ($PRC_{A,3}$) or the B-side PRc measurement for satellite number 3 ($PRC_{B,3}$), both of these PRc measurements and their corresponding $DIFF_{A-B,3}$ value have been excluded from the RMCB value computation. Once the post-exclusion RMCB value is computed and determined to be accurate, that RMCB value 480 is added to all of the B-side PRc measurements exactly as before. Assuming the satellite number 1 and satellite number 2 a priori A-side and B-side PRc measurements are the same for FIG. 4c as they were for FIG. 4b (i.e., 461 equals 431, 471 equals 441, 462 equals 432, and 472 equals 442), and furthermore assuming that the ADJ $DIFF_{A-B,3}$ 453 value in FIG. 4b was zero, then the post-exclusion RMCB value 480 for FIG. 4c 480 will be exactly equal to the accurately computed RMCB value 450 for FIG. 4b. In this case, as shown in FIG. 4c, the a posterori ADJ $PRc_{B,1}$ 471, $ADJ_{B,2}$ 472, ADJ $DIFF_{A-B,1}$ 481 and ADJ $DIFF_{A-B,2}$ 482, will all be exactly equal to their corresponding values in FIG. 4b. The only differences between FIGS. 4c and 4b are thus limited to the satellite number 3. For illustrative purposes, the faulty PRc measurement for satellite number 3 in FIG. 4c has been assumed to be the one from the A-side. Even though this fault is obvious when comparing the faulted case difference between the numerical zero point for the A-side axis ($Zero_A$ 460) and the faulty A-side PRc measurement 463 in FIG. 4c versus the fault-free case difference between the $Zero_A$ 430 and the A-side PRc measurement 433 in FIG. 4b, the clock bias estimator/adjuster does not have the luxury of being able to compare the faulted case against the fault-free case for identification/isolation. The best the clock bias estimator/adjuster can do is to detect the fault within the pair of A-side and B-side PRc measurements for satellite number 3 and then excluded those measurements from the RMCB computation process.

Since it is not immediately obvious, it should be pointed out that the FD&E process does not—in and of itself—improve the ultimate level of integrity. In fact, the FD&E process can actually degrade integrity per se. Recognize that the purpose of the FD&E process is to accurately apportion the effects of any faults (i.e., PRc inaccuracies) to their most probable source (i.e., the measurements from the affected satellite). For example, as shown in FIG. 4c, the fault was assumed to be in the pair of PRc measurements for satellite number 3 and the FD&E process accurately apportioned the resultant effect of that fault to the correct satellite as evidenced by the large ADJ $DIFF_{A-B,3}$ 483 for that satellite. Alternatively, however, the effect of the fault could instead have been entirely apportioned to both satellite number 1 and satellite number 2 by picking a different RMCB value that would have decreased ADJ $DIFF_{A-B,3}$ 483 to zero while correspondingly increasing ADJ $DIFF_{A-B,1}$ 481 and ADJ $DIFF_{A-B,2}$ 482. Surprisingly, these two totally different fault effect apportionments provide exactly the same accuracy. The reason stems from a fundamental principle of all DGNSS systems: since the choice of reference time clocks for DGNSS positioning/navigation applications is completely arbitrary, an offset can be added to or subtracted from each and every differential correction in a consistent ensemble of differential corrections without changing the accuracy of that ensemble of differential corrections. This principle is what enables the mathematical adjustment of the B-side PRc measurements by an RMCB value in the first place. Even more surprisingly than the two alternative fault effect apportionments providing exactly the same accuracy, the latter apportionment (the incorrect one) actually provides higher (more conservative) integrity than the former apportionment (the correct one from FIG. 4c) The reason for higher integrity with an incorrect apportionment is that there will appear to be more total error—as observed across the full ensemble of ADJ $DIFF_{A-B,i}$ values, and therefore reported via the UDRE values—with the incorrect apportionment than will appear with the correct apportionment. The methods embodied in the present invention produce a near optimal (as correct as statistically possible) apportionment in order to minimize the over-estimation of the total apparent error and thereby prevent unduly impacting continuity or availability as a result of unnecessarily high integrity.

In addition to outputting the unadjusted packet of A-side estimates 231, the adjusted packet of B-side estimates 232, and the associated list 233 describing any detected faulty measurements, the clock bias estimator/adjuster stores the list of detected faulty measurements for the following iteration. At the next iteration when a new set of A-side and B-side estimates are available, the pair of PRc measurements from any satellite listed as having been detected as being affected by a faulty measurement on the previous iteration are a priori excluded from the RMCB computation process. This enhances the probability that the RMCB value will not be corrupted by a faulty measurement of the current iteration since a satellite affected by a faulty measurement on the previous iteration is likely to still be affected by a faulty measurement at the current iteration (for example, the correlation time of multipath errors is typically many times longer than the iteration rate). Even though the pair of PRc measurements from a satellite previously listed as being affected by a faulty measurement are excluded from the current RMCB computation process, that satellite's A-side PRc measurements are still included in the unadjusted packet of A-side estimates, and that satellite's B-side PRc measurements are still adjusted by the RMCB value and included in the adjusted packet of B-side estimates. This exclusion from the RMCB computation process but not from the subsequent processing and final DGPS correction signal broadcast 160 is a major enhancement to the continuity and availability compared to the current state of the art. Integrity is preserved by accurately estimating and broadcasting the associated UDRE parameters. To allow a satellite previously listed as faulty to reenter the RMCB computation process at a following iteration, an additional rigorous statistical consistency test is conducted on the a posteriori $ADJ\ DIFF_{A-b,i}$ values for the satellite to determine if the fault which had been affecting the satellite's PRc measurements has cleared. If this statistical consistency test passes, then that satellite is removed from the list of satellites with faulty measurements for the following iteration.

Figure 5A:
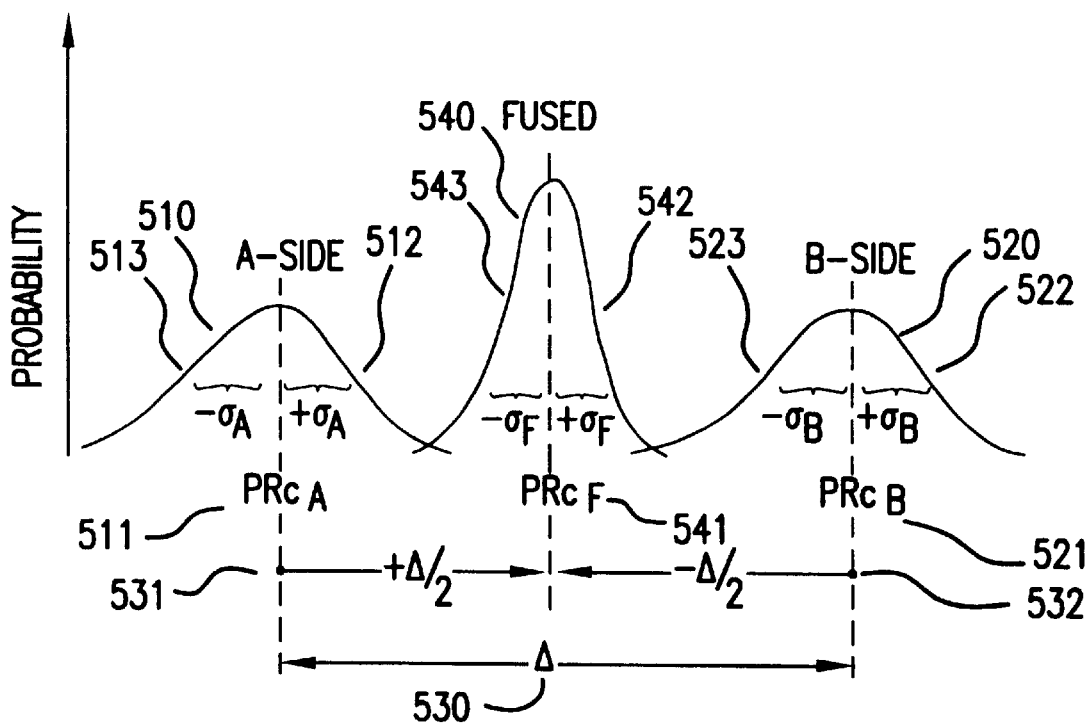
FIGS. 5a–5b are a graphical representations of the fusion process with probability density functions.

FIG. 5 is a graphical representation of the optimal data fusion and error estimation processes which occur within the fuser and SV-unique data estimator portion 240 of the processing apparatus 130 in the first embodiment. In FIG. 5a, three example probability density functions (PDFs) are shown for illustration purposes. The first PDF 510 represents the PRc estimate for one satellite out of the plurality of satellites which are addressed in the packet of A-side estimates 231. Since the particular PRc estimate for the example satellite from the packet of A-side estimates will have some numerical value which is more or less close to the true ("ideal") PRc value, and that true PRc value may fall anywhere in the range of very large positive numbers to very large negative numbers, the example PRc estimate for the example satellite from the packet of A-side estimates 511 has been placed at an arbitrary point along the abscissa in FIG. 5a. Because PRc estimates are ultimately based on the measurements made by a physical GPS receiver, they are corrupted by both noise errors and bias errors. The noise errors affecting the example A-side PRc estimate 511 for the example satellite are represented by the Gaussian PDF 510 centered on the example A-side PRc estimate 511. The noise errors are characterized by standard deviation values (represented by the $\sigma_A$ symbols) about the example A-side PRc estimate 511, where the positive standard deviation 512 is equal to the negative standard deviation 513, as shown by FIG. 5a. In the absence of any additional information from the packet of B-side estimates 232, elementary statistics indicates that the best possible ("optimal") estimate of the true PRc value would be the example A-side PRc estimate 511 and that the probable error in the optimal A-side PRc estimate 511 relative to the true PRc value would be given by the first PDF 510.

The second PDF 520 in FIG. 5a represents the PRc estimate from the packet of B-side estimates 232 for the same satellite as in the first PDF 510. Just as the particular PRc estimate for the example satellite from the packet of A-side estimates 511 has a numerical value close to the true PRc value, so too will the particular PRc estimate for the example satellite from the packet of B-side estimates 521 likewise have a numerical value close to the true PRc value. For illustration purposes, FIG. 5a assumes that the example B-side PRc estimate 521 for the example satellite is slightly larger than the corresponding example A-side PRc estimate 511 and so the example B-side PRc estimate 521 has been placed at a slightly higher point along the abscissa in FIG. 5a than the example A-side PRc estimate 511. In actual operation, the B-side PRc estimate for a particular satellite may be more than, smaller than, or equal to the corresponding A-side PRc estimate. In a manner similar to that for the noise errors affecting the example A-side PRc estimate 511, the noise errors affecting the example B-side PRc estimate 521 are represented by the Gaussian PDF 520 centered on the example B-side PRc estimate. These B-side PRc estimate noise errors are characterized by standard deviation values (represented by $\sigma_B$ symbols) about the example PRc estimate, where the positive standard deviation 522 is equal to the negative standard deviation 523 as shown by FIG. 5a. For illustration purposes, FIG. 5a assumes that the example B-side standard deviations 522 and 523 are equal to the example A-side standard deviations 512 and 513 although this is not the general case in actual operation. Focusing on the example B-side PRc estimate and ignoring any additional information from the packet of A-side estimates 231, elementary statistics indicates that the optimal estimate of the true PRc value would be the example B-side PRc estimate 521 and that the probable error in the optimal B-side PRc estimate 521 relative to the true PRc value would be given by the second PDF 520.

Figure 5B:
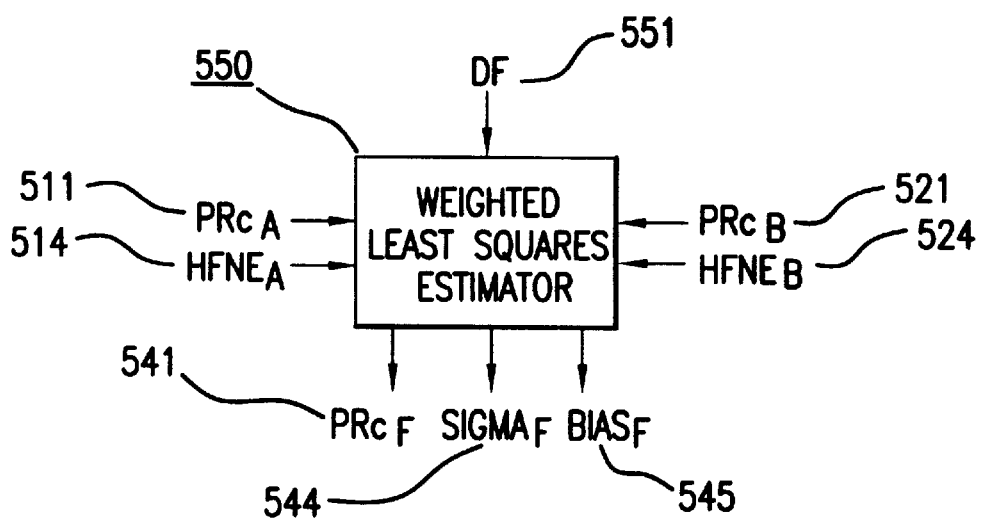

Recognize that the example A-side PRc estimate 511 and the example B-side PRc estimate 521 include two independent estimates of the exact same quantity, namely the true PRc value. With two independent estimates of the same quantity, intermediate statistics indicates that a better optimal estimate of the true quantity is obtained by "averaging" of the two independent estimates where the particular "averaging" method depends on the nature of the errors in the independent estimates. Since one of the objectives of the present invention is to make efficient use of GPS satellite signal observations produced by all GPS receivers in the DGPS ground station to achieve better accuracy, the present invention produces a truly optimal estimate of the true PRc value by fusing the two independent PRc estimates from the two GPS receivers wherein the fusion process constitutes the requisite error-sensitive "averaging" method. In FIG. 5b, the particular fusion process in the preferred embodiment is satellite-by-satellite weighted least squares averaging (i.e., optimal estimation) 550 where the input measurements are the A-side PRc estimate 511 and the B-side PRc estimate 521 for the particular satellite and the weighting factors are functions of the input HFNE estimates produced by the A-side noise estimator 514 (same as 360) and the B-side noise estimator 524 (same as 360), a carry-over estimate of the absolute value of the persistent bias error from the preceding time series of A-side and B-side PRC estimates for the particular satellite, a carry-over estimate of the random fluctuations in the persistent bias error from the preceding time series of A-side and B-side estimates for the particular satellite, and a desensitization factor (DF) 551 to optionally allow forcing more pessimistic fused error estimates than would otherwise be obtained to enhance integrity.

Fusion processes like the satellite-by-satellite weighted least squares estimation 550 shown in FIG. 5b are preferred for several reasons: 1) they are well known and understood by those skilled in the art and are therefore more likely to be accepted by the authorities responsible for certifying/approving safety critical aspects of aircraft landing systems, 2) it can be mathematically proved that the output fused PRc estimate— shown as "$PRc_F$" 541 in FIG. 5b—is statistically optimal when the input measurement weighting factors are accurate, and 3) they facilitate the computation and output of a random (noise) error estimate—shown as "$SIGMA_F$" 544 in FIG. 5b—and a non-random (total bias) error absolute value estimate—shown as "$BIAS_F$" 545 in FIG. 5b—for the output fused PRc estimate 541 which can both be mathematically proved to be statistically optimal when the input measurement weighting factors are accurate.

The result of the fusion process 550 shown in FIG. 5b operating with the inputs corresponding to the first PDF 510 and second PDF 520 as shown in FIG. 5a is illustrated by the third PDF 540 shown in FIG. 5a. Assuming that the A-side HFNE estimate 514 accurately represents the example A-side standard deviations 512 and 513, that the B-side HFNE estimate 524 accurately represents the example B-side standard deviations 522 and 523, and that the example A-side standard deviations 512 and 513 are exactly equal to the example B-side standard deviations 522 and 523 as shown in FIG. 5a, then the output fused PRc estimate 541 will be exactly equal to the simple algebraic average of the example A-side PRc estimate 511 and the example B-side PRc estimate 521. This simple algebraic averaging under these "equal weighting" assumptions is illustrated at the bottom of FIG. 5a where the total difference between the example A-side PRc estimate 511 and the example B-side PRc estimate 521 is represented by the $\Delta$ symbol 530 and the output fused PRc estimate ($PRc_F$) 541 has been placed at a point along the abscissa in FIG. 5a exactly $\Delta/2$ more 531 than the example A-side PRc estimate 511 and exactly $\Delta/2$ less 532 than the example B-side PRc estimate 521.

In a manner similar to that for the noise errors affecting the example A-side PRc estimate 511 and the example B-side PRc estimate 521, the noise errors affecting the example fused PRc estimate 541 are represented by the Gaussian curve centered on the example fused PRc estimate 541. These example fused PRc noise errors are characterized by standard deviation values (represented by $\sigma_F$ symbols) about the example fused PRc estimate, where the positive standard deviation 542 is equal to the negative standard deviation 543 as shown by FIG. 5a. Under the foregoing "lequal weighting" assumption, the fused PRc standard deviation estimates 542 and 543 will be exactly equal to the square root of one-half (approximately 0.7071) times either the example A-side standard deviations 512 and 513 or the example B-side standard deviations 522 and 523 respectively. This fact is illustrated in FIG. 5a with the Gaussian curve centered on the example fused PRc estimate 541 for the third PDF 540 only being roughly 70.71% as wide as either the first PDF 510 centered on the example A-side PRc estimate 511 or the second PDF 520 centered on the example B-side PRc estimate 521.

It will become obvious to those of ordinary skill in the art that the present invention's methodology for fusing of the information from the packet of A-side estimates 231 with the information from the packet of B-side estimates 232 on a satellite-by-satellite basis results in a more optimal estimate of the true PRc value for each satellite than can be obtained using the information from the packet of A-side estimates 231 alone or the information from the packet of B-side estimates 232 alone. The reduction in the standard deviation of each fused PRc estimate 541 relative to both the standard deviation of the corresponding A-side PRc estimate 511 and the standard deviation of the corresponding B-side PRc estimate 521 is directly responsible for the random (noise) errors of the fused PRc estimate 541 with respect to the noisy input PRc estimates 511 and 521. In addition to each fused PRc estimate 541 being improved with respect to noise errors, the present invention's fusion methodology also serves to preserve much of that accuracy improvement when GPS receiver measurement bias errors occur, and—just as importantly—allows an absolute value estimate of the non-random (total bias) error affecting the fused PRc estimate to be generated and used to improve the integrity of the fused PRc estimate.

To illustrate the processing of bias errors, first recognize that the fuser and SV-unique data estimator can measure the differences 530, 531, and 532 between and among the A-side PRc estimate 511, the B-side PRc estimate 521, and the fused PRc estimate 541. Assume for example that the B-side PRc estimate 521 shown in FIG. 5a is subject to a positive bias error (say one caused by a B-side GPS receiver hardware fault) and that the true PRc value is actually very near the example A-side PRc estimate 511 shown in FIG. 5a. In this case, the measured difference ($\Delta$ 530) between the A-side PRc estimate 511 and the B-side PRc estimate 521 will be an estimate of the absolute value of the total bias error (albeit a somewhat noisy estimate because the A-side PRc estimate 511 and the B-side PRc estimate 521 are themselves corrupted by high-frequency noise effects which are largely ameliorated through filtering). By virtue of using a fusion process like the satellite-by-satellite weighted least squares estimation 550 as shown in FIG. 5b, the fused PRc estimate 541 will only accrue part of the bias error in the B-side PRc estimate 521.

In the example of FIG. 5a where the A-side HFNE estimate 514 and the B-side HFNE estimate 524 are both accurate and equal, the biased B-side PRc estimate 521 is counterbalanced by the unbiased A-side PRc estimate 511 and the fused PRc estimate 541 only accrues half of the total bias error (i.e., to $+\Delta/2$ 531). Because the fuser and SV-unique data estimator cannot independently determine whether the measured difference ($\Delta$ 530) between the A-side PRc estimate 511 and the B-side PRc estimate 521 is due to a positive bias error in the B-side PRc estimate 521 (i.e., the original assumption of this example) or is instead due to an equivalent negative bias error in the A-side PRc estimate 511 (i.e., an alternate assumption where the true PRc value is actually very near the example B-side PRc estimate 521), the fuser and SV-unique data estimator cannot independently determine whether the fused PRc estimate 541 has accrued half of the total bias error in the positive direction relative to a true PRc value near the example A-side PRc estimate 531 (per the original assumption of this example) or if the fused PRc estimate 541 has accrued half of the total bias error in the negative direction relative to a true PRc value near the example B-side PRc estimate 532 (the alternate assumption). Although the fuser and SV-unique data estimator cannot determine the algebraic sign of the accrued bias error affecting the output PRc estimate, it can accurately determine the absolute value of the accrued total bias error as being equal to half of the measured difference ($\Delta$ 530).

Without a fusion process like the one embodied in the present invention and disclosed herein, the best that can be achieved by a traditional cross-checking comparison of the A-side PRc estimate 511 against the B-side PRc estimate 512 is that there is a 50—50 chance that the output PRc estimate (regardless of whether that output comes from the A-side PRc estimate 511 or the B-side PRc estimate 512) is subject to a bias error whose magnitude is equal to the measured difference (Δ 530). The fusion process therefore reduces the maximum total bias error effect on the output PRc estimate by 50% and increases the confidence in the associated output total bias error absolute value estimate by 50% (i.e., from a 50—50 chance to absolute certainty).

As shown at the bottom of FIG. 5b, the fuser and SV-unique data estimator portion 240 of the processing apparatus 130 outputs a fused PRc (PRc$_F$) 541, a noise error estimate (SIGMA$_F$) 544, and a total bias error absolute value estimate (BIAS$_F$) 545 for each satellite out of the plurality of satellites which are addressed in both the packet of A-side estimates 231 and the packet of B-side estimates 232. The fused PRc (PRc$_F$) 541 is as discussed earlier in this FIG. 5b description. The noise error estimate SIGMA$_F$ 544 addresses the fused PRc noise error standard deviation values 542 and 543 as discussed earlier as well as the noise in the estimate of the absolute value of the total bias error and the DF 551. The total bias error absolute value estimate BIAS$_F$ 545 equates to the absolute value of half of the total measured difference (Δ) 530 as also discussed earlier.

The fusion of the PRc estimates and SV-unique data estimation is done by a satellite-by-satellite weighted least squares mathematical operation. However, fusion and data estimation may be done by a variety of other methods, such as simple averaging, Kalman filtering and other embodiments as will become apparent to those skilled in the art. Still other modifications, which will occur to persons skilled in the art, may be made without departing from the scope of the invention as defined in the claims which follow below.

Figure 6:
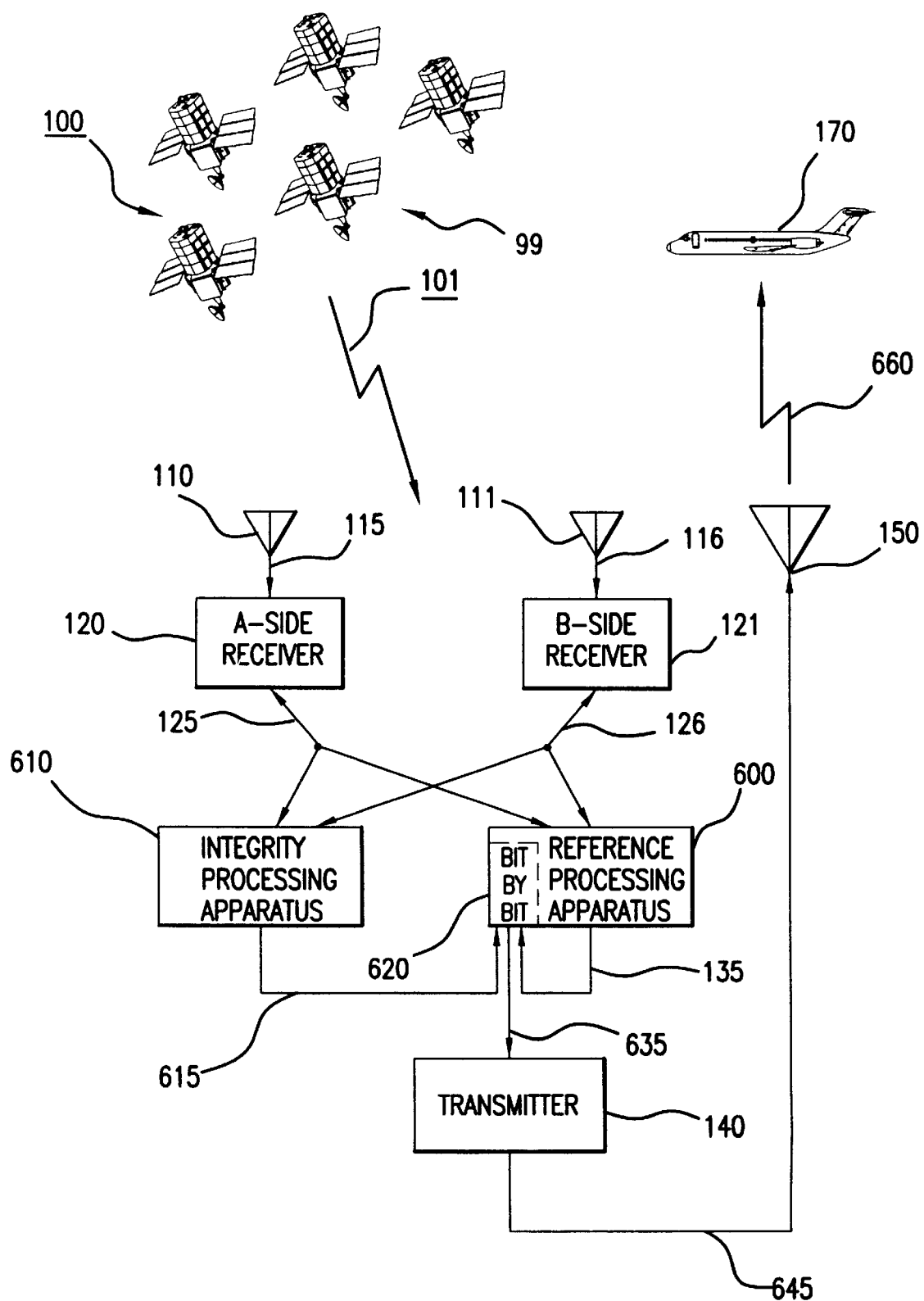
FIG. 6 is a block diagram of the second embodiment of a DGNSS system in accordance with the present invention.

FIG. 6 is a block diagram of the second embodiment of the present invention. Much of this embodiment is the same as in the first embodiment, including the two independent GPS signal receivers 120 and 210 each with its own dedicated GPS receiving antenna 110 and 111, the received composite electrical signals presented by the GPS receiving antennas 115 and 116, the sets of raw observation data 125 and 126 output by the GPS receivers to the processing apparatus, the integrated message stream 135, the transmitter 140, the transmit antenna 150, and the mobile receiving equipment on nearby aircraft 170. The "reference" processing apparatus 600 shown in FIG. 6 is similar to the processing apparatus 130 described in the first embodiment with one significant exception: the addition of a bit-by-bit comparator 620. The second embodiment also includes an "integrity" processing apparatus 610 which is basically identical to the processing apparatus 130 described in the first embodiment.

The reference processing apparatus 600 includes the same functional components as the processing apparatus 130 described in the first embodiment (FIG. 2). Since the input sets of raw observation data 106 and 111 provided by the GPS receivers are identical to those in the first embodiment (FIG. 1), the output integrated message stream 135 generated by the reference processing apparatus will be identical to that which would have been generated by the processing apparatus 130 of the first embodiment.

Similarly, the integrity processing apparatus 610 also includes the same functional components as the processing apparatus 130 described in the first embodiment. Since the input sets of raw observation data 106 and 111 provided by the GPS receivers are identical to those provided to the reference processing apparatus 600, the output integrated message stream 615 generated by the integrity processing apparatus 610 is identical to the output integrated message stream 135 generated by the reference processing apparatus 600. The only times that the integrity processing apparatus generated output integrated message stream 615 will disagree with the reference processing apparatus generated output integrated message stream 135 will be when a critical fault has occurred within either reference processing apparatus or the integrity processing apparatus. Any disagreement between the two output integrated message streams 135 and 615 is detected by the bit-by-bit comparator 620 which, upon detecting a disagreement, will stop forwarding the now-suspect output integrated message stream 635 to the transmitter 140. Thus, the integrity of the transmitter's modulated radio frequency output 645 may be improved over the integrity of the transmitter's modulated radio frequency output 145 in the first embodiment. The integrity of the broadcast DGPS signals 660 may likewise be improved relative to the integrity of the broadcast DGPS signals 160 in the first embodiment.

Variations of the second embodiment will undoubtedly become obvious to those skilled in the art for providing extra layers of integrity protection over and above those provided by the second embodiment. There are numerous ways that additional bit-by-bit comparisons between the two ought-to-be-identical integrated message streams—one stream 135 from the reference processing apparatus and one stream 615 from the integrity processing apparatus—can be used to further assure the ultimate reliability of the broadcast DGPS signals 660 by way of pre-broadcast integrity verification. Such variations are within the scope of the present invention. For example, an additional bit-by-bit comparator may be implemented within the integrity processing apparatus 610 to compare duplicate copies of the two integrated message streams 135 and 615 with its "disagreement detected" result interconnected in such a way as to shut off the transmitter 140 and thereby preclude broadcasting an unverified/unverifiable integrated message stream.

Another example variation of the second embodiment of the present invention which focuses on transmitter-induced integrity failure modes is to add an aircraft-type modulated radio frequency receiver to the ground station and implement an additional bit-by-bit comparator (exact location unimportant) to perform a post-broadcast comparison of the actual as-broadcast integrated data stream 660 recovered by the aircraft-type modulated radio frequency receiver against a stored copy of the intended-for-broadcast integrated data stream 135 (or 635 or 615); the "disagreement detected" results again being used to shut off the transmitter and optionally used for long-term ground station transmitter/antenna 140/150 performance monitoring. Post-broadcast integrity verification variations of the second embodiment such as this are also within the scope of the present invention.

Figure 7:
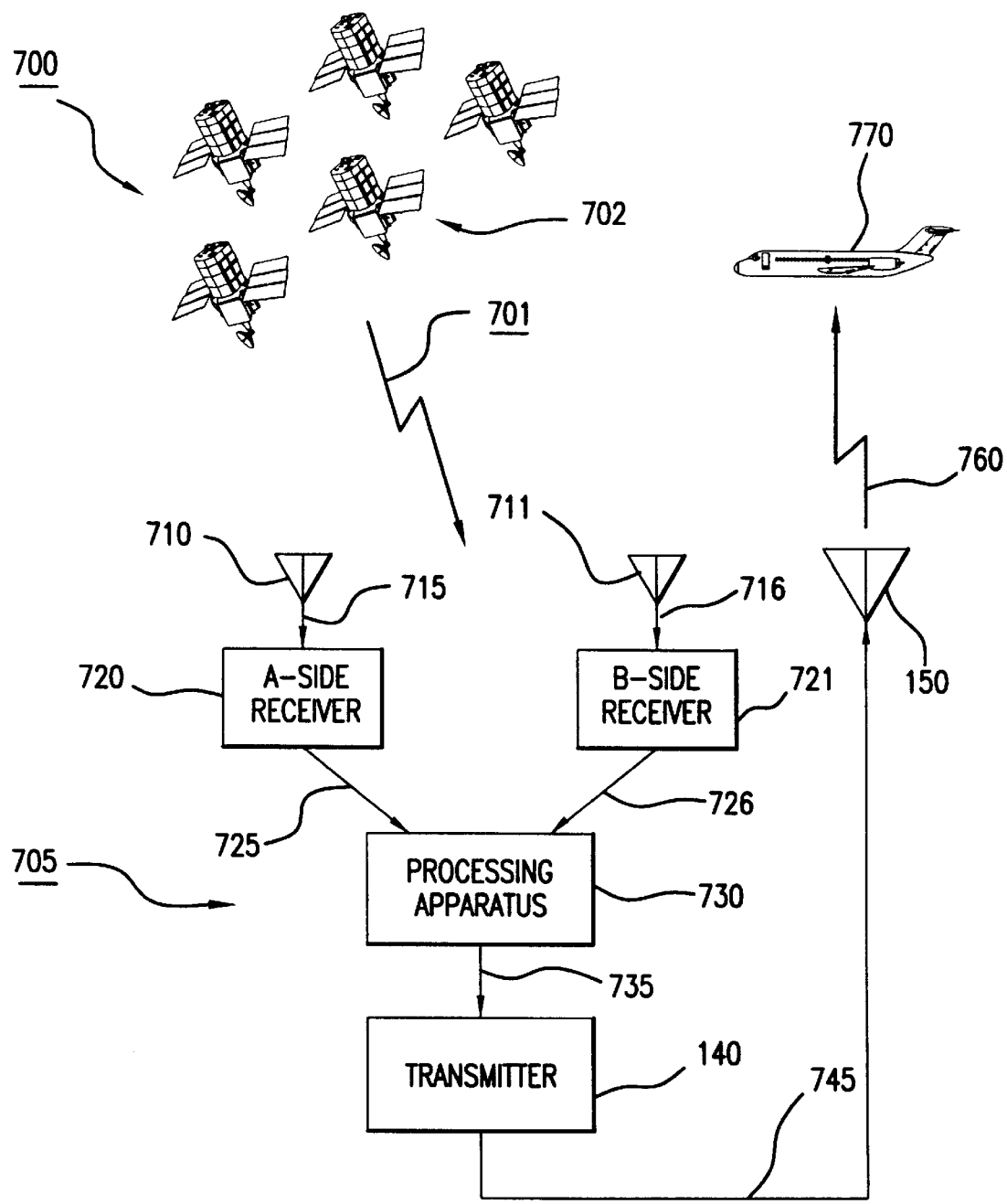
FIG. 7 is a top-level block diagram of the third, fourth, and fifth embodiments of a DGNSS system in accordance with the present invention.

FIG. 7 is a top-level block diagram of the third, fourth, and fifth embodiments of the present invention. These embodiments are all very similar to the first embodiment. Each of them is also subject to the additional integrity improvement options described for the second embodiment. Due to the large measure of commonality among these embodiments, they are all addressed in FIG. 7 (which is very similar to FIG. 1 for the first embodiment) even though the embodiments are not interchangeable.

The third embodiment operates with the plurality of GLONASS satellites 700 in lieu of the plurality of GPS satellites 100 as the GNSS satellites to be augmented. The ground station 705 incorporates two independent GLONASS signal receivers 720 and 721, each with its own dedicated GLONASS receiving antenna 710 and 711, to receive the radio frequency signals broadcast by each GLONASS satellite 702 twice. The A-side GLONASS receiver 720 and the B-side GLONASS receiver 721 independently lock on to and track each GLONASS satellite signal present in the associated composite electrical signals 715 and 716. The A-side GLONASS receiver and the B-side GLONASS receiver periodically output sets of raw observation data 725 and 726 respectively for the GLONASS satellites being tracked to the processing apparatus. These observation data sets are functionally identical to the observation data sets output by the GPS receivers 125 and 126 in the first embodiment of the invention (i.e., including the current PRm and demodulated NAV data for each satellite), albeit with different numerical content and format due to the satellite signal signal-in-space (SIS) differences between GPS and GLONASS. The processing apparatus 730 collects and processes the sets of observation data produced by the GLONASS receivers, fuses the PRc and RRc values derived from the observation data, and generates an integrated message stream 735 which includes the combined DGLONASS correction messages and other system messages for output to the transmitter 140. The remainder of the third embodiment is equivalent to the first/second embodiments with the exception that the modulated radio frequency output 745, the DGLONASS correction signals 760, and the mobile receiving equipment on nearby aircraft 770 replace the DGPS equivalents in the first/second embodiments. FIGS. 2 through 6 apply to the third embodiment as well, since the GLONASS-GPS format/content differences are localized to and accommodated by the third embodiment versions of the A-side PRc generator 200 and B-side PRc generator 205. As for the first/second embodiments, the A-side receiving antenna 110 and the B-side receiving antenna 111 should both be installed in locations as free of multipath signals as possible and be separated by a distance at least as large as effective multipath bandwidth for the particular GLONASS receivers being used (e.g., 900 meters for standard correlator spacing GLONASS receivers). The A-side GLONASS receiver 120 and the B-side GLONASS receiver 121 should also be as dissimilar as possible (i.e., completely separate development and manufacturing).

The fourth embodiment 705 operates with GPS satellites and GLONASS satellites making up the plurality of GNSS satellites tracked 700 instead of just GPS satellites as per the first embodiment or just GLONASS satellites as per the third embodiment. FIG. 7 and the immediately preceding detailed description—simply substituting "GPS/GLONASS" for "GLONASS"—apply to fourth embodiment as well as to the third embodiment. As those skilled in the art will recognize, this simple substitution only works with hybrid GPS-GLONASS signal receivers 720 and 721 whose output sets of raw observation data 725 and 726 include current PRm values referenced to a common receiver-internal time source (i.e., not an internal time source for the GPS satellite PRm values and a separate internal time source for the GLONASS satellite PRm values); otherwise, it is as though the pair of GPS receivers and the pair of GLONASS receivers are running independently and the best that the present invention can do would be to generate separate integrated message streams for GPS augmentation and for GLONASS augmentation.

The fifth embodiment 705 operates with either GPS satellites and civil ranging augmentation (CRA) satellites, or GLONASS satellites and CRA satellites, or GPS satellites, GLONASS satellites and CRA satellites making up the plurality of GNSS satellites tracked 700. FIG. 7 and the foregoing detailed description of the third embodiment apply to fifth embodiment with an appropriate substitution of the GNSS constellation name for "GLONASS". Like the fourth embodiment, this simple substitution requires hybrid GNSS signal receivers 720 and 721 whose output sets of raw observation data 725 and 726 include current PRm values referenced to a common receiver-internal time source. This embodiment processes the CRA satellites strictly as a source of GPS-like or GLONASS-like pseudoranging information. It does not use any DGPS or DGLONASS information that may be provided by the CRA satellite (see the seventh embodiment).

Figure 8:
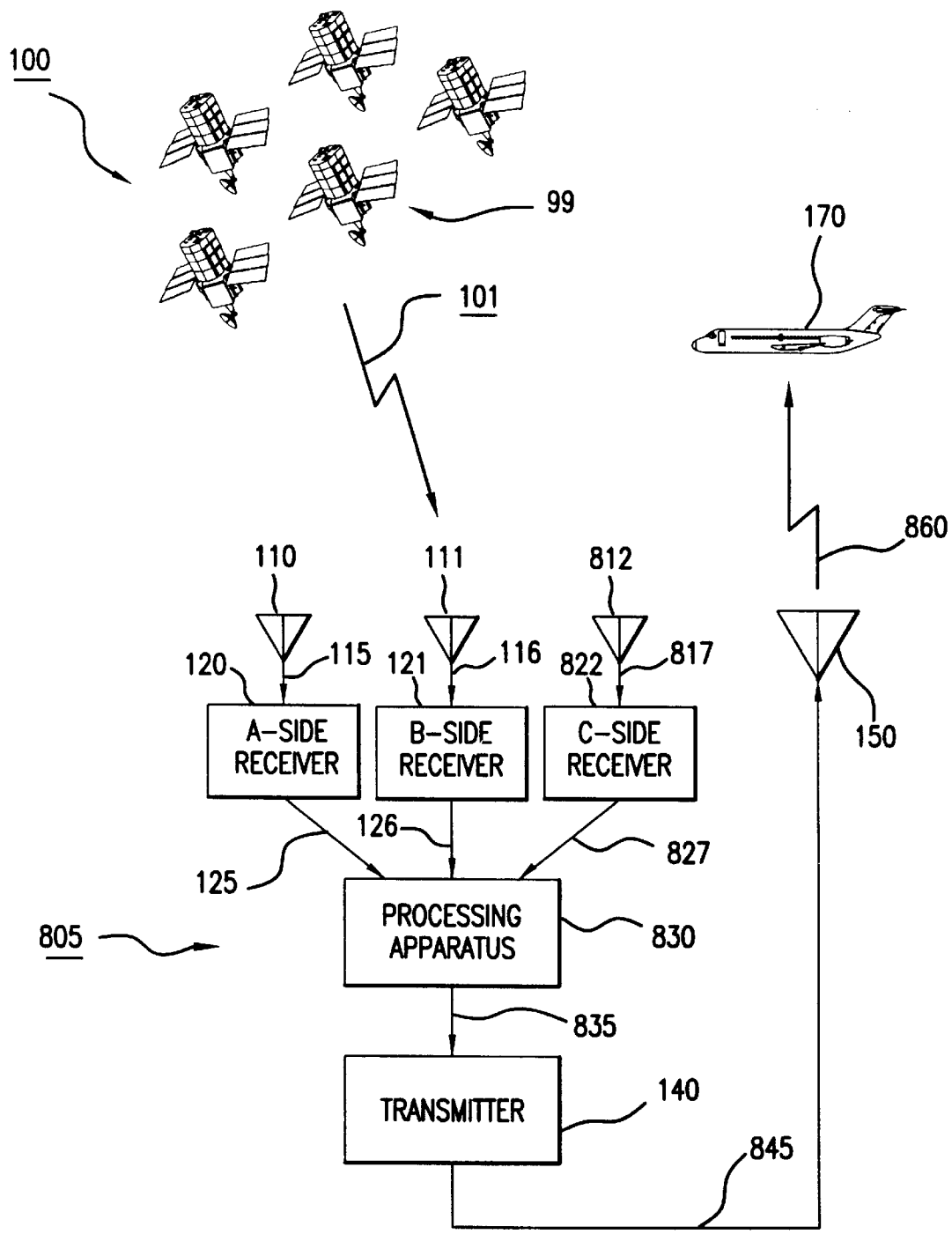
FIG. 8 is a block diagram of the sixth embodiment of a DGNSS system in accordance with the present invention.

FIG. 8 is a top-level block diagram of the sixth embodiment of the present invention. Although this figure shows the sixth embodiment as being an extension of the first embodiment, those skilled in the art will recognize that the sixth embodiment may instead be an extension of the third through fifth embodiments and that the integrity improvements of the second embodiment are equally applicable to the third through sixth embodiments. This sixth embodiment uses three GNSS satellite signal receivers (A-side, B-side, and C-side) to provide additional accuracy, continuity, and availability enhancements over and above the corresponding embodiment using only two GNSS satellite signal receivers (A-side and B-side). Due to the large measure of commonality between FIG. 1 and FIG. 8, only the FIG. 8 differences with respect to FIG. 1 are described in detail. The three GNSS satellite signal receivers are described herein as being GPS satellite signal receivers, although this is for illustrative purposes only. In accordance with the third through fifth embodiments, the GNSS satellite signal receivers may instead be GLONASS, GPS/GLONASS, GPS/CRA, GLONASS/CRA, or GPS/GLONASS/CRA satellite signal receivers.

The sixth embodiment 805 incorporates a third independent GPS signal receiver 822 with its own dedicated GPS receiving antenna 812—along with the two independent GPS signal receivers 120 and 121 with their own dedicated GPS receiving antennas 110 and 111—to receive the radio frequency signal broadcast by each GPS satellite three times. The C-side GPS receiver 822 operates just like the other two GPS receivers and provides functionally identical sets of raw observation data 827 to the processing apparatus 830. The processing apparatus 830 collects and processes the sets of raw observation data produced by the three GPS receivers, fuses the PRc and UDRE information derived from the observation data, and generates an integrated message stream 835 which includes the combined DGPS correction messages and other system messages. The remainder of the sixth embodiment is functionally identical to the first/second embodiments with the exception that the modulated radio frequency output 845 and the DGPS correction signals 860 replace their equivalent items in the first/second embodiments (145 and 170). Since the additional information from the third GPS receiver (i.e., the synchronized and adjusted packet of C-side estimates) is incorporated by the fuser and SV-unique data estimator, the resulting set of combined DGPS correction estimates is statistically more accurate than the set of combined DGPS correction which would have been developed using just A-side and B-side estimates. Thus, the integrated message stream 835, the modulated radio frequency output 845, and the DGPS correction signals 860 are all more accurate from the sixth embodiment (and thereby provide more continuity and availability) than their corresponding items from the first/second embodiments (135, 145, and 170). In parallel with the first through fifth embodiments, the A-side receiving antenna, B-side receiving antenna, and C-side receiving antenna should all be installed in locations as free of multipath signals as possible and be mutually separated by a distance at least as large as effective multipath bandwidth for the particular GNSS receivers being used. The A-side receiver, B-side receiver, and C-side receiver should likewise be as dissimilar as possible.

Figure 9:
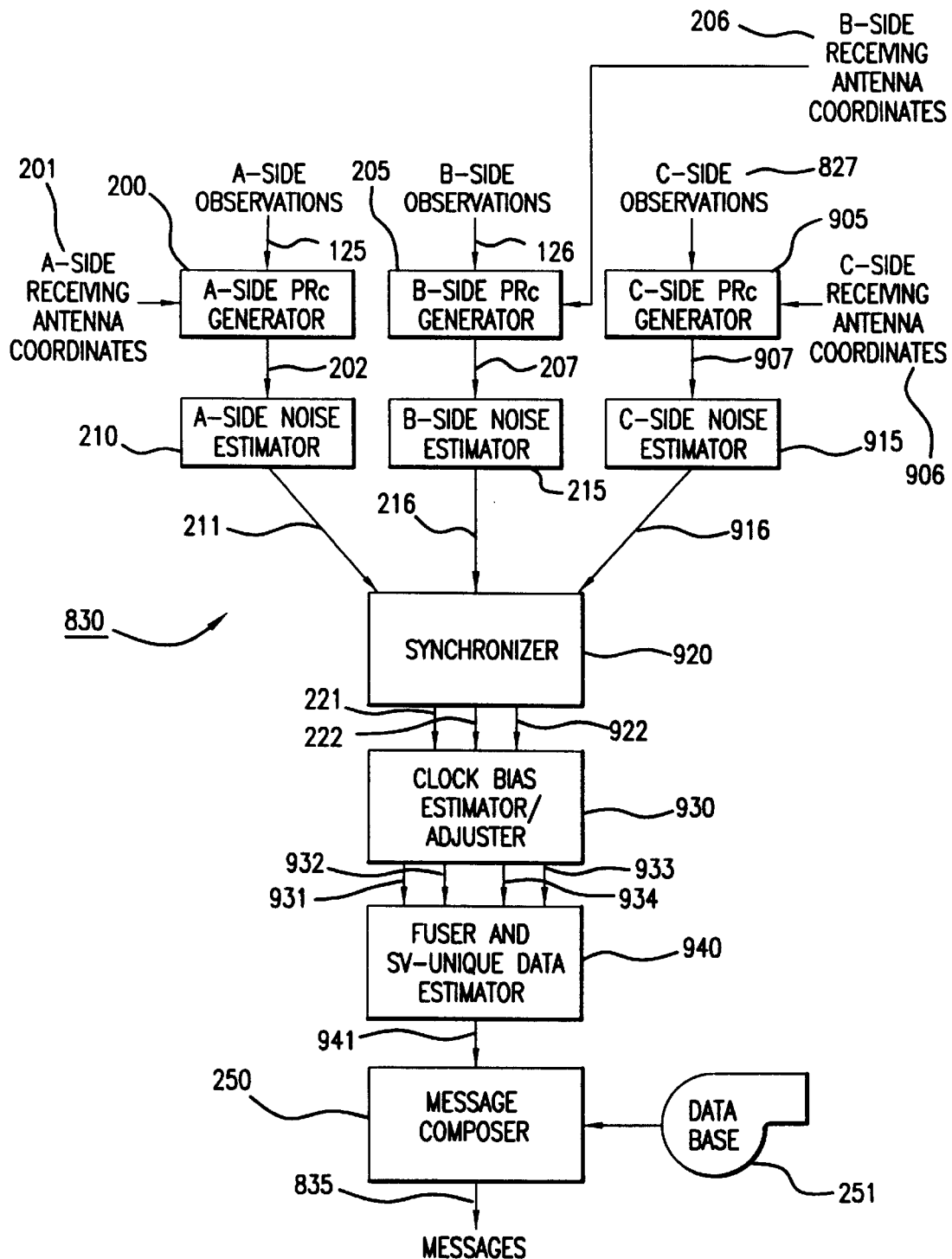
FIG. 9 is a block diagram illustrating the signals produced in the sixth embodiment and the method of the sixth embodiment.

FIG. 9 is a block diagram illustrating the operations performed and the signals sent within the processing apparatus 830 in the sixth embodiment. As with the preceding embodiments, this portion of the method of the invention may be performed by a programmed processor. A-side GPS receiver observation data 125, B-side GPS receiver observation data 126, and C-side GPS receiver observation data 827 are independently accepted and processed by the A-side PRc generator 200, B-side PRc generator 205, and C-side PRc generator 905 respectively. Following the same techniques as described for the first embodiment of the present invention, the A-side PRc generator 200 computes and outputs a packet of information 202 containing the PRc and RRc values at the A-side point in time based on the A-side observation data 125 and the known coordinates 201 of the A-side receiving antenna, the B-side PRc generator 205 computes and outputs a packet of information 207 containing the PRc and RRc values at the B-side point in time based on the B-side observation data 126 and the known coordinates 206 of the B-side receiving antenna, and the C-side PRc generator 905 computes and outputs a packet of information 907 containing the PRc/RRc values at the C-side point in time based on the C-side observation data 827 and the known coordinates 906 of the C-side receiving antenna.

Likewise following the techniques of the first embodiment, the packet of A-side PRc/RRc value information 202 is accepted and processed by the A-side noise estimator 210 to result in the packet of A-side PRc/RRc and high-frequency noise estimate values 211, the packet of B-side PRc/RRc value information 207 is accepted and processed by the B-side noise estimator 215 to result in the packet of B-side PRc/RRc and high-frequency noise estimate values 216, and the packet of C-side PRc/RRc value information 907 is accepted and processed by the C-side noise estimator 915 to result in the packet of C-side PRc/RRc and high-frequency noise estimate values 916. The parallelism just described and embodied by the A-side, B-side, and C-side processing chains will no doubt have already become obvious to those skilled in the art.

The packet of A-side PRc/RRc and high-frequency noise estimate values 211, the packet of B-side PRc/RRc and high-frequency noise estimate values 216, and the packet of C-side PRc/RRc and high-frequency noise estimate values 916 are accepted and processed in parallel by the three-sided synchronizer 920. The three-sided synchronizer 920 operates in a manner identical to that of the (two-sided) synchronizer 220 in the first embodiment, albeit synchronizing three packets of PRc/RRc and high-frequency noise estimate values rather than just two packets of PRc/RRc and high-frequency noise estimate values.

The time synchronized packet of A-side estimates 221, packet of B-side estimates 222, and packet of C-side estimates 922 provided by the three-sided synchronizer are then accepted and processed in parallel by the three-sided clock bias estimator/adjuster 930. The three-sided clock bias estimator/adjuster 930 operates in a manner equivalent to that of the (two-sided) clock bias estimator/adjuster 230 in the first embodiment. Although the apparent GPS time clock in any one of the three GPS receivers can be selected to serve as the unadjusted reference, the preferred embodiment uses the apparent GPS time clock in the C-side GPS receiver 822 as that reference and mathematically adjusts the information in the packet of A-side estimates 221 and the packet of B-side estimates 222 to effectively bring the apparent GPS time clock in the A-side GPS receiver 120 and the apparent GPS time clock in the B-side GPS receiver 121 into alignment with the apparent GPS time clock in the C-side GPS receiver 822.

The aligned packet of A-side estimates 931, packet of B-side estimates 932, packet of C-side estimates 933, and the list of faulty measurement detection data 934 from the three-sided clock bias estimator/adjuster are accepted and processed collectively by the three-sided fuser and SV-unique data estimator 940. Using a technique similar to that of the first embodiment, the three-sided fuser and SV-unique data estimator 940 optimally fuses the information from the packet of A-side estimates 931, the packet of B-side estimates 932, and the packet of C-side estimates 933 to develop a set of combined DGPS correction estimates and associated error estimates which is statistically more accurate than any subset of A-side/B-side/C-side estimates. Once the combined DGPS correction estimates and error estimates have been developed for each satellite out of the plurality of satellites being tracked, the three-sided fuser and SV-unique data estimator outputs them as a single integrated packet of combined estimates 941.

The remainder of the sixth embodiment elements shown by FIG. 9 (250, 251, and 835) are functionally identical to the corresponding elements shown by FIG. 2 (250, 251, and 130) for the first/second embodiments.

Figure 10:
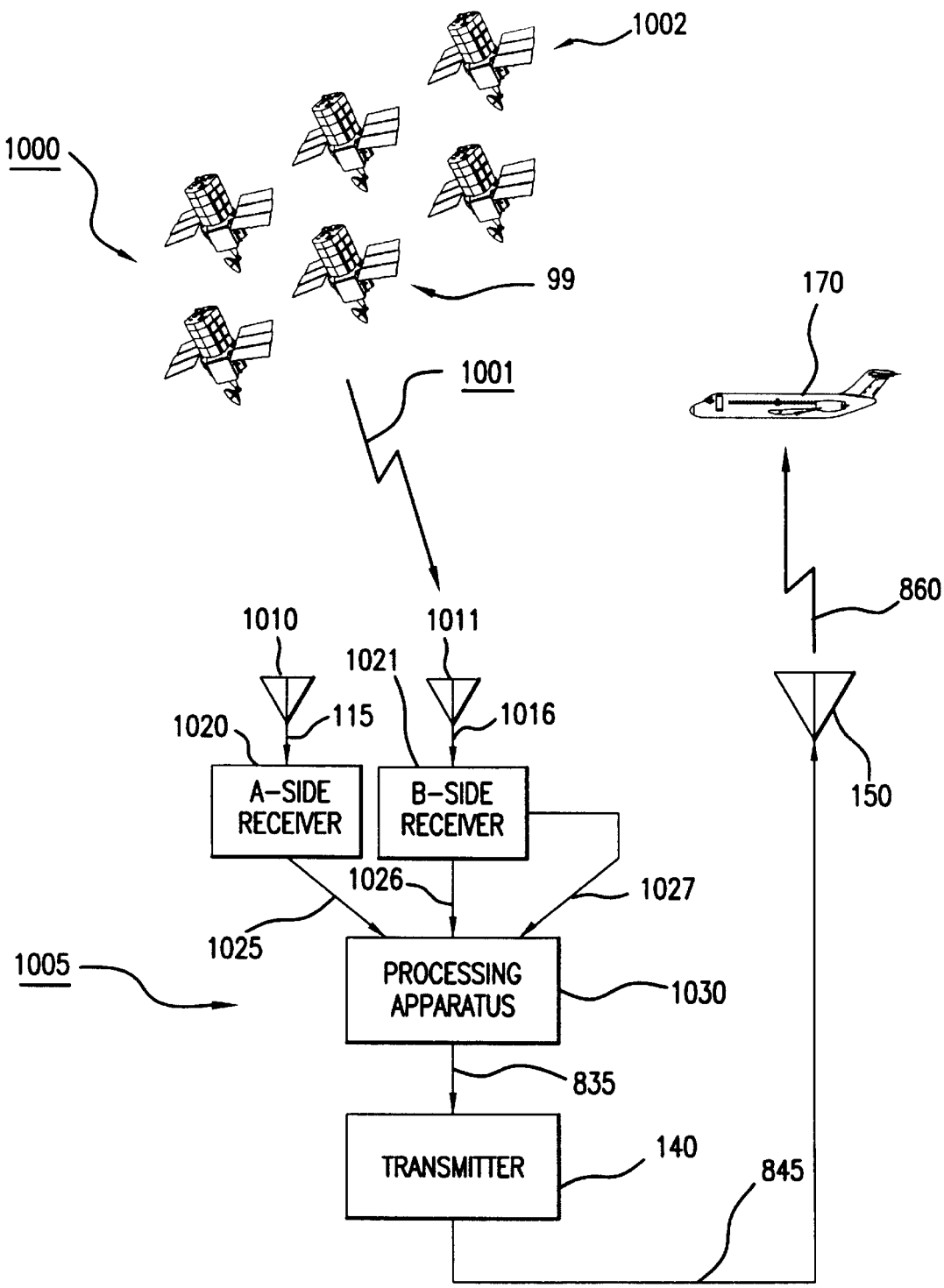
FIG. 10 is a block diagram of the seventh embodiment of a DGNSS system in accordance with the present invention.

FIG. 10 is a top-level block diagram of the seventh embodiment of the present invention. Although this figure shows the seventh embodiment as being an extension to the sixth embodiment, those skilled in the art will recognize that the seventh embodiment may instead be an extension of the first through fifth embodiments. This embodiment requires at least one special signal receiver which is able to access wide area DGNSS (WADGNSS) correction data provided by a GNSS augmentation service. Example GNSS augmentation services which can provide such WADGNSS correction data are the ground networks which will be supporting WAAS satellites and EGNOS satellites. The necessary WADGNSS correction data can be digitally superimposed on the ranging augmentation signals broadcast by these CRA satellites in such a manner that special GNSS satellite signal receivers can directly recover and output the WADGNSS correction data broadcast by those GNSS satellites. Other GNSS augmentation services provide WADGNSS correction data using signals which cannot be directly accessed by GNSS satellite signal receivers, but which are accessible by using special signal receivers (e.g., satellite communication signal receivers). Either method of accessing WADGNSS correction data is satisfactory, as are those alternate methods which will doubtlessly occur to those skilled in the art.

For the sake of clarity, FIG. 10 shows an example version of the seventh embodiment where: 1) the special signal receiver for accessing the WADGNSS correction data is a GPS/WAAS satellite signal receiver, 2) the special GPS/WAAS satellite signal receiver is also used as the B-side receiver 1021, and 3) one out of the plurality of in-view GNSS satellites 1000 is a WAAS satellite 1002 broadcasting WADGNSS correction data applicable to the signals broadcast by the plurality of in-view GPS satellites 99 as well as to the CRA signal broadcast by the WAAS satellite itself. Recognize that the choice of this particular example version for FIG. 10 is for illustrative purposes only. In keeping with the first through fifth embodiments, there are versions of the seventh embodiment appropriate to other combinations of GNSS constellations and WADGNSS correction data as well (e.g., GLONASS/EGNOS, GPS/GLONASS/EGNOS, GPS/CRA/WAAS, GPS/non-WAAS WADGPS correction data).

The example version of the seventh embodiment 1005 incorporates two independent GPS/WAAS signal receivers 1020 and 1021 with their own dedicated GPS/WAAS receiving antennas 1010 and 1011 to receive the radio frequency signals broadcast by the GPS satellites and the WAAS satellite 1001 twice. The A-side GPS/WAAS signal receiver 1020 and the B-side special GPS/WAAS signal receiver 1021 operate similarly as far as tracking the GPS and WAAS CRA signals is concerned, and both receivers provide functionally identical sets of raw observation data 1025,1026 to the processing apparatus 1030. The B-side special GPS/WAAS signal receiver 1021 additionally provides a demodulated copy of the WADGPS/WADWAAS correction data 1027 to the processing apparatus 1030. Although only one of the GPS/WAAS satellite signal receivers needs to be able to access and output the WADGPS/WADWAAS correction data broadcast by the WAAS satellites, and that special GPS/WAAS satellite signal receiver only needs to be able to access and output the WADGPS/WADWAAS correction data from a single WAAS satellite, it will be immediately apparent to those skilled in the art that variations wherein both GPS/WAAS satellite signal receivers access and output WADGPS/WADWAAS correction data or wherein the WADGPS/WADWAAS correction data from more than one WAAS satellite is accessed and output are also within the scope of the present invention.

The processing apparatus 1030 collects and processes the sets of raw observation data 1025 and 1026 produced by the GPS/WAAS receivers in the same manner as illustrated by FIG. 9 for the set of A-side raw observation data 125 and the set of B-side raw observation data 126 respectively. The analogous set of C-side raw observation data 827 and the C-side PRC generator function 905 illustrated by FIG. 9 are replaced by a processing function which mathematically evaluates the WADGPS/WADWAAS correction data 1027 received from the B-side receiver with respect to a hypothetical C-side receiving antenna location described by 906—including modeling the tropospheric aberration for the hypothetical C-side receiving antenna location—in order to derive a synthetic packet of PRc/RRc value information which replaces the actual C-side PRc generator produced packet of PRc/RRc value information 907 shown in FIG. 9. The remaining processing apparatus 1030 functions for the seventh embodiment are equivalent to those illustrated by FIG. 9 for the sixth embodiment, albeit addressing the CRA signal from the WAAS satellite along with the signals from the GPS satellites (i.e., the integrated message stream 1035 contains combined DGPS/DWAAS correction messages).

Those skilled in the art will recognize that the DGNSS correction messages from the seventh embodiment are likely to be less accurate than the DGNSS correction messages from the sixth embodiment for a like plurality of DGNSS satellite signals due to the difficulties encountered in obtaining broadcast WADGNSS differential corrections that are as accurate for a hypothetical location as those DGNSS differential corrections which may be generated using a DGNSS receiver actually placed at that exact location. However, those skilled in the art will also recognize that the DGNSS correction messages from the seventh embodiment are likely to be more accurate than the DGNSS correction messages from the first or third through fifth embodiment for a like plurality of DGNSS satellite signals due to the fact that additional DGNSS differential correction information ("pseudo-measurements") for each DGNSS satellite signal—appropriately deweighted—are used in developing the DGNSS correction messages from the seventh embodiment. Those skilled in the art will further recognize that the continuity enhancements of the sixth embodiment (i.e., the ability to continue operating despite a failure of one of the three antenna/receiver sides) are retained in the seventh embodiment even though only two physical antenna/receiver sides are used.

What is claimed is:

1. A ground station for providing DGNSS correction signals, the ground station comprising:

at least two independent GNSS satellite signal receivers each with a separate antenna that receives signals from GNSS satellites;

a first processing apparatus that collects and processes information from the at least two independent GNSS receivers, wherein the first processing apparatus fuses DGNSS correction data derived from the at least two independent GNSS receivers to generate combined DGNSS correction messages and the first processing apparatus is functional with two independent GNSS satellite signal receivers, the first processing apparatus including a means for determining GNSS satellite-specific measurement noise errors which are included in the DGNSS correction data derived from the at least two independent GNSS receivers;

a transmitter that broadcasts the combined DGNSS correction messages and other DGNSS information as a composite DGNSS correction signal to GNSS receiving equipment; and means for generating differential corrections from the signals received by each of the at least two independent GNSS satellite signal receivers, wherein the means for generating differential corrections comprises:

means for computing an expected PR measurement for a GNSS satellite signal from a particular GNSS satellite at a given time based on the particular GNSS satellite's demodulated NAV data, the particular GNSS satellite receiver's antenna coordinates, and an estimate of the particular GNSS satellite receiver's measurement clock time;

means for computing a PRc by subtracting an actual PR measurement from the expected PR measurement;

means for computing an expected PR measurement for a GNSS satellite signal from a particular GNSS satellite at a given time based on the particular GNSS satellite's demodulated NAV data, the particular GNSS satellite's receiver's antenna coordinates, and an estimate of the particular GNSS satellite receiver's measurement clock rate; and means for computing a PRc by subtracting an actual PR measurement from the expected PR measurement.

2. A ground station for providing DGNSS correction signals, the ground station comprising:

at least two independent GNSS satellite signal receivers each with a separate antenna that receive signals from GNSS satellites;

a first processing apparatus that collects and processes information from the at least two independent GNSS receivers, wherein the first processing apparatus fuses DGNSS correction data derived from the at least two independent GNSS receivers to generate combined DGNSS correction messages and the first processing apparatus is functional with two independent GNSS satellite signal receivers, the first processing apparatus including a means for determining GNSS satellite-specific measurement noise errors which are included in the DGNSS correction data derived from the at least two independent GNSS receivers; and a transmitter that broadcasts the combined DGNSS correction messages and other DGNSS information as a composite DGNSS correction signal to GNSS receiving equipment, wherein the means for determining GNSS satellite-specific measurement noise errors comprises:

means for computing a synthetic measurement, wherein the synthetic measurement occurs at a given time within a time window, the time window being measured by two end-points, and wherein the given time corresponds to a time when an actual intervening measurement occurs;

means for comparing the synthetic measurement against the actual intervening measurement at the given time; and means for computing a noise corrupting value based on a sequence of comparisons between the synthetic measurements and the actual intervening measurements.

3. The ground station according to claim 1, further comprising means for synchronizing reception of data for the at least two independent GNSS receivers.

4. The ground station according to claim 3, wherein the means for synchronizing the reception of data comprises:

means for comparing reference times for information collection and processing from the at least two independent GNSS receivers against a desired reference time for the intended-for-broadcast plurality of DGNSS corrections; and means for mathematically adjusting the information and reference times from the at least two independent GNSS receivers to equal the desired reference time for the intended-for-broadcast plurality of DGNSS corrections.

5. The ground station according to claim 3, further comprising means for adjusting the DGNSS correction data from one or more of the at least two independent GNSS receivers to account for a relative measurement clock bias between the at least two independent GNSS receivers.

6. The ground station according to claim 5, wherein the means for adjusting the DGNSS corrections data comprises:

means for optimally estimating the relative measurement clock bias between the at least two independent GNSS receivers;

means for ensuring that the optimally estimated relative measurement clock bias has not been corrupted by faulty measurements made by the at least two independent GNSS receivers;

means for detecting any faulty measurements made by the at least two independent GNSS receivers;

means for selecting the DGNSS correction data from one of the at least two independent GNSS receivers to serve as a nominal measurement clock, the nominal measurement clock excluding any detected faulty measurements; and means for mathematically adjusting the DGNSS correction data from the one of the at least two independent GNSS receivers not selected to serve as the nominal measurement clock to account for the optimally estimated relative measurement clock bias to bring the apparent GNSS time clock in the one of the at least two independent GNSS receivers not selected to serve as the nominal measurement clock into effective alignment with the apparent GNSS time clock in the one of the at least two independent GNSS receivers selected to serve as the nominal measurement clock.

7. The ground station according to claim 3, further comprising means for optimally fusing the DGNSS correction data for each satellite from the plurality of satellites being tracked and observed by the at least two independent GNSS receivers.

8. The ground station according to claim 7, wherein the means for optimally fusing the DGNSS correction data comprises:

means for detecting the presence of unequal high-frequency noise errors affecting the DGNSS correction data for each particular satellite from each particular GNSS receiver;

means for detecting the presence of persistent bias differences between the DGNSS correction data for each particular satellite from each particular GNSS receiver;

means for permitting the optional incorporation of a fictitious noise term to cause more pessimistic fused error estimates; and means to accurately estimate random noise errors and non-random bias errors present in the optimally fused DGNSS correction data for each particular satellite.

9. The ground station according to claim 3, further comprising:

means for generating combined DGNSS correction messages, wherein each DGNSS correction message contains appropriately translated, scaled, and formulated fused DGNSS correction data and accurate DGNSS correction noise error and DGNSS correction bias error estimates for each satellite for the plurality of satellites being tracked and observed by the at least two independent GNSS receivers.

10. The ground station according to claim 3, further comprising a second processing apparatus that duplicates the processing of the first processing apparatus.

11. The ground station according to claim 10, further comprising:

a pre-broadcast integrity verification means, wherein the pre-broadcast integrity verification means comprises means for obtaining an intended-for-broadcast integrated message stream containing combined DGNSS correction messages and related other system messages output by the first processing apparatus and obtaining a corresponding integrated message stream containing combined DGNSS correction messages and related other system messages output by the second processing apparatus;

means for comparing the integrated message stream messages from the first processing apparatus against the corresponding integrated message stream messages from the second processing apparatus;

means for alerting an operator if the integrated message stream messages from the first processing apparatus and the corresponding integrated message stream messages from the second processing apparatus are unequal; and means for preventing the delivery of the intended-for-broadcast integrated message stream to the transmitter if the integrated message stream messages from the first processing apparatus and the corresponding integrated message stream from the second processing apparatus are unequal.

12. The ground station according to claim 3, further comprising a data link receiver.

13. The ground station according to claim 12, further comprising a post-broadcast integrity verification means, the post-broadcast integrity verification means comprising:

means for obtaining an intended-for-broadcast integrated message stream containing combined DGNSS correction messages and related other system messages output by the processing apparatus;

means for receiving and digitally decoding a broadcast DGNSS correction signal so as to recover a broadcast integrated message stream containing combined DGNSS correction messages and related other system messages;

means for comparing the intended-for-broadcast integrated message stream messages against the corresponding recovered broadcast integrated message stream messages;

means for alerting an operator if the intended-for-broadcast messages and the corresponding broadcast messages are unequal; and means for ceasing transmission from the transmitter if the intended-for-broadcast messages and the corresponding broadcast messages are unequal.

14. The ground station according to claim 3, wherein the plurality of GNSS satellites comprises a constellation of a mixture of one or more of GPS satellites, GLONASS satellites, and CRA satellites.

15. The ground station according to claim 3, wherein wide area differential GNSS (WADGNSS) correction data provided by a GNSS augmentation service is utilized in lieu of signal tracking observations from one or more of the at least two independent GNSS satellite signal receivers.

16. The ground station according to claim 15, further comprising:

one or more receivers for accessing and demodulating the WADGNSS correction data from one or more independent GNSS augmentation services; and means for mathematically evaluating recovered WADGNSS correction data, including modeling tropospheric aberration, with respect to a hypothetical location near the at least two independent GNSS satellite signal receivers' antennas for a given time to derive synthetic PRc and RRc values.

17. A method for providing DGNSS correction signals, comnprising:

receiving signals from GNSS satellites using at least two independent GNSS satellite signal receivers each with a separate antennae;

collecting and processing information from the at least two independent GNSS receivers including determining GNSS satellite-specific measurement noise errors, wherein a processing apparatus fuses DGNSS correction data, including the GNSS satellite-specific measurement noise errors, derived from the at least two independent GNSS receivers to generate combined DGNSS correction messages, the processing apparatus being functional with two independent GNSS satellite signal receivers;

broadcasting the combined DGNSS correction messages along with other DGNSS information as a composite DGNSS correction signal to GNSS receivino equipment; and determining GNSS satellite-specific measurement noise errors;

generating differential corrections from the signals received by each of the at least two independent GNSS satellite signal receivers, wherein generating differential corrections comprises the steps of:

computing an expected PR measurement for a GNSS satellite signal from a particular GNSS satellite at a given time based on the particular GNSS satellite's demodulated NAV data, the particular GNSS satellite receiver's antenna coordinates, and an estimate of the particular GNSS satellite receiver's measurement clock time;

computing a PRc by subtracting an actual PR measurement from the expected PR measurement;

computing an expected PR measurement for a GNSS satellite signal from a particular GNSS satellite at a given time based on the particular GNSS satellite's demodulated NAV data, the particular GNSS satellite's receiver's antenna coordinates, and an estimate of the particular GNSS satellite receiver's measurement clock rate; and computing a PRc by subtracting an actual PR measurement from the expected PR measurement.

18. A method for providing DGNSS correction signals, comprising:

receiving signals from GNSS satellites using at least two independent GNSS satellite signal receivers each with a separate antennae;

collecting and processing information from the at least two independent GNSS receivers including determining GNSS satellite-specific measurement noise errors, wherein a processing apparatus fuses DGNSS correction data, including the GNSS satellite-specific measurement noise errors, derived from the at least two independent GNSS receivers to generate combined DGNSS correction messages, the processing agpparatus being functional with two independent GNSS satellite signal receivers;

determining GNSS satellite-specific measurement noise errors; and broadcasting the combined DGNSS correction messages along with other DGNSS information as a composite DGNSS correction signal to GNSS receiving equipment, wherein determining GNSS satellite-specific measurement noise errors comprises the steps of:

computing a synthetic measurement, wherein the synthetic measurement occurs at a given time within a time window, the time window being measured by two end-points, and wherein the given time corresponds to a time when an actual intervening measurement occurs;

comparing the synthetic measurement against the actual intervening measurement at the given time; and computing a noise corrupting value based on a sequence of comparisons between the synthetic measurements and the actual intervening measurements.

19. The method according to claim 17, further comprising the step of synchronizing reception of data for the at least two independent GNSS receivers.

20. The method according to claim 19, wherein synchronizing the reception of data comprises the steps of:

comparing reference times for information collection and processing from the at least two independent GNSS receivers against a desired reference time for the intended-for-broadcast plurality of DGNSS corrections; and mathematically adjusting the information and reference times from the at least two independent GNSS receivers to equal the desired reference time for the intended-for-broadcast plurality of DGNSS corrections.

21. The method according to claim 17, further comprising the step of adjusting the DGNSS correction data from one or more of the at least two independent GNSS receivers to account for a relative measurement clock bias between the at least two independent GNSS receivers.

22. The method according to claim 21, wherein adjusting the DGNSS corrections data comprises the steps of:

optimally estimating the relative measurement clock bias between the at least two independent GNSS receivers;

ensuring that the optimally estimated relative measurement clock bias has not been corrupted by faulty measurements made by the at least two independent GNSS receivers;

detecting any faulty measurements made by the at least two independent GNSS receivers;

selecting the DGNSS correction data from one of the at least two independent GNSS receivers to serve as a nominal measurement clock, the nominal measurement clock excluding any detected faulty measurements; and mathematically adjusting the DGNSS correction data from the one of the at least two independent GNSS receivers not selected to serve as the nominal measurement clock to account for the optimally estimated relative measurement clock bias to bring the apparent GNSS time clock in the one of the at least two independent GNSS receivers not selected to serve as the nominal measurement clock into effective alignment with the apparent GNSS time clock in the one of the at least two independent GNSS receivers selected to serve as the nominal measurement clock.

23. The method according to claim 22, further comprising the step of optimally fusing the DGNSS correction data for each satellite from the plurality of satellites being tracked and observed by the at least two independent GNSS receivers.

24. The method according to claim 23, wherein optimally fusing the DGNSS correction data comprises the steps of:

detecting the presence of unequal high-frequency noise errors affecting the DGNSS correction data for each particular satellite from each particular GNSS receiver;

detecting the presence of persistent bias differences between the DGNSS correction data for each particular satellite from each particular GNSS receiver;

permitting the optional incorporation of a fictitious noise term to cause more pessimistic fused error estimates; and estimating accurate random noise errors and non-random bias errors present in the optimally fused DGNSS cor each particular satellite.

* * * * *